US011544816B2

(12) United States Patent
Kim et al.

(10) Patent No.: US 11,544,816 B2
(45) Date of Patent: Jan. 3, 2023

(54) ELECTRONIC APPARATUS AND CONTROLLING METHOD THEREOF

(71) Applicant: SAMSUNG ELECTRONICS CO., LTD., Suwon-si (KR)

(72) Inventors: Donghyun Kim, Suwon-si (KR); Jisu Lee, Suwon-si (KR); Youngsu Moon, Suwon-si (KR); Seungho Park, Suwon-si (KR); Taegyoung Ahn, Suwon-si (KR); Younghoon Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 36 days.

(21) Appl. No.: 16/836,263

(22) Filed: Mar. 31, 2020

(65) Prior Publication Data

US 2021/0166345 A1   Jun. 3, 2021

(30) Foreign Application Priority Data

Nov. 28, 2019   (KR) .................. 10-2019-0156162

(51) Int. Cl.
*G06T 3/40*        (2006.01)
*G06T 7/13*        (2017.01)
(Continued)

(52) U.S. Cl.
CPC ....... *G06T 3/4046* (2013.01); *G06Q 30/0272* (2013.01); *G06Q 30/0273* (2013.01);
(Continued)

(58) Field of Classification Search
None
See application file for complete search history.

(56) References Cited

U.S. PATENT DOCUMENTS 9,299,128 B2 * 3/2016 Tian ..................... G06T 3/0093
10,037,594 B2   7/2018 Murahashi et al.
(Continued)

FOREIGN PATENT DOCUMENTS

EP    3506199 A1    7/2019
EP    3541080 A1    9/2019
(Continued)

OTHER PUBLICATIONS

Afonso, Mariana, Fan Zhang, and David R. Bull. "Spatial resolution adaptation framework for video compression." Applications of Digital Image Processing XLI. vol. 10752. International Society for Optics and Photonics, 2018 . . . (Year: 2018).*
(Continued)

*Primary Examiner* — Andrae S Allison
(74) *Attorney, Agent, or Firm* — Sughrue Mion, PLLC

(57) ABSTRACT

Disclosed is an electronic apparatus. The electronic apparatus includes a processor configured to obtain first upscaling information of an input image using an artificial intelligence (AI) model that is trained to obtain upscaling information of an image. The processor is also configured to downscale the input image based on the obtained first upscaling information, and obtain an output image by upscaling the downscaled image based on an output resolution.

18 Claims, 31 Drawing Sheets

(51) Int. Cl.
*G06T 5/00* (2006.01)
*G06Q 30/02* (2012.01)
*G06Q 30/08* (2012.01)
*H04L 51/046* (2022.01)
*H04L 51/52* (2022.01)

(52) U.S. Cl.
CPC ......... *G06Q 30/0276* (2013.01); *G06Q 30/08* (2013.01); *G06T 3/4053* (2013.01); *G06T 5/002* (2013.01); *G06T 7/13* (2017.01); *H04L 51/046* (2013.01); *H04L 51/52* (2022.05)

(56) References Cited

U.S. PATENT DOCUMENTS

| | | | |
|---|---|---|---|
| 10,165,204 B2* | 12/2018 | Zhou | H04N 5/247 |
| 10,825,141 B1* | 11/2020 | Park | H04N 19/59 |
| 2011/0019096 A1* | 1/2011 | Lee | H04N 9/646 |
| | | | 348/607 |
| 2012/0320966 A1* | 12/2012 | Guo | H04N 21/44008 |
| | | | 375/240.02 |
| 2016/0292819 A1 | 10/2016 | Murahashi et al. | |
| 2016/0330400 A1* | 11/2016 | Long | H04N 21/2356 |
| 2018/0342045 A1 | 11/2018 | Lutz et al. | |
| 2019/0035113 A1 | 1/2019 | Salvi et al. | |
| 2019/0073757 A1 | 3/2019 | Ahn et al. | |
| 2019/0130217 A1* | 5/2019 | Wu | G06K 9/4628 |
| 2019/0206026 A1 | 7/2019 | Vemulapalli et al. | |
| 2020/0211172 A1* | 7/2020 | Nam | G06T 5/40 |
| 2020/0394755 A1 | 12/2020 | Park et al. | |

FOREIGN PATENT DOCUMENTS

| | | |
|---|---|---|
| JP | 2009-302730 A | 12/2009 |
| JP | 2012019380 A | 1/2012 |
| JP | 6158950 B2 | 7/2017 |
| KR | 10-2010-0068690 A | 6/2010 |
| KR | 10-2011-0009021 A | 1/2011 |
| KR | 10-1760420 B1 | 7/2017 |
| KR | WO 2019/168332 A1 * | 2/2019 |
| KR | 10-2019-0099853 A | 8/2019 |
| WO | 2018/154092 A1 | 8/2018 |
| WO | 2019168332 A1 | 9/2019 |

OTHER PUBLICATIONS

Kim, Jiwon, Jung Kwon Lee, and Kyoung Mu Lee. "Accurate image super-resolution using very deep convolutional networks." Proceedings of the IEEE conference on computer vision and pattern recognition. 2016. (Year: 2016).*
Li, Yawei, et al. "3D appearance super-resolution with deep learning." Proceedings of the IEEE/CVF Conference on Computer Vision and Pattern Recognition. 2019. (Year: 2019).*
He, He, and Wan-Chi Siu. "Single image super-resolution using Gaussian process regression." CVPR 2011. IEEE, 2011. (Year: 2011).*
Communication dated Jul. 21, 2020 from the European Patent Office in application No. 20163821.0.
International Search Report (PCT/ISA/210) and Written Opinion (PCT/ISA/237) dated Aug. 24, 2020 issued by the International Searching Authority in International Application No. PCT/KR2020/004783.
Kim et al., "Accurate Image Super-Resolution Using Very Deep Convolutional Networks", 2010, pp. 1646-1654, 9 pages total.
Kim et al., "Deeply-Recursive Convolutional Network for Image Super-Resolution", 2016, pp. 11637-11645, 9 pages total.
Lim et al., "Enhanced Deep Residual Networks for Single Image Super-Resolution", 2016, pp. 136-144, 9 pages total.
Communication dated Dec. 16, 2021, issued by the European Patent Office in counterpart European Application No. 20163821.0.
Communication dated Oct. 10, 2022 by the Chinese Patent Office in Chinese Patent Application No. English 202010361576.6.

* cited by examiner

FIG. 7B

```
        714   713
   712 ) 710 ) 711
    714
1 0 0 1 0 0 1 0 0    01001 → bin9
  bit1 bit3 bit4 bit2 bit0
```

FIG. 7C

| | | |
|---|---|---|
| Type1 Feature (without stride) | 1 0 0 1 0 0 1 0 0<br>bit1 bit3 bit4 bit2 bit0 | 01001 → type1 bin9 |
| Type2 Feature (stride2) | 722 724 720 723 721<br>1 0 0 1 0 0 1 0 0<br>bit1 bit3 bit4 bit2 bit0 | 00110 → type2 bin6 |
| Type3 Feature (stride3) | 0 ... 1 0 0 1 0 0 1 0 0 ... 0<br>bit1   bit3   bit4   bit2   bit1 | 00000 → type3 bin0 |
| Type4 Feature (stride4) | 0 ... 1 0 0 1 0 0 1 0 0 ... 0<br>bit1   bit3   bit4   bit2   bit1 | 01000 → type4 bin8 |

ELECTRONIC APPARATUS AND CONTROLLING METHOD THEREOF

CROSS-REFERENCE TO RELATED APPLICATION

This application is based on and claims priority under 35 U.S.C. § 119 from Korean Patent Application No. 10-2019-0156162, filed on Nov. 28, 2019, in the Korean Intellectual Property Office, the disclosure of which is incorporated by reference herein in its entirety.

BACKGROUND

1. Field

The disclosure relates to an electronic apparatus and a method for controlling thereof. More particularly, the disclosure relates to an electronic apparatus performing image processing using an artificial intelligence (AI) model and a method for controlling thereof.

2. Description of Related Art

The development of electronic technology has enabled development and dissemination of various types of electronic apparatuses. In particular, display devices used in various places, such as homes, offices, public places, and the like, have recently been developed for recent years.

Recently, a demand for high-resolution image services has been greatly increasing. Accordingly, as the distribution of a display device such as a television (TV) capable of supporting a high-resolution image is extended, there are increasing cases where upscaling of an image is performed in various environments, such as a set-top box (STB), a public TV, etc., and the upscaled image is transmitted to a display device such as a TV.

However, according to various upscaling techniques and broadcasting environments, the upscaled images have different image qualities and thus show poor performance compared to the upscaling technique provided in a TV.

SUMMARY

Various example embodiments of the disclosure address the above disadvantages and other disadvantages not described above.

Provided herein is an electronic apparatus including: a processor configured to perform operations including: obtaining first upscaling information of an input image by using a first artificial intelligence (AI) model, wherein the first AI model is trained to obtain upscaling information, and performing one of: determining not to downscale the input image, or obtaining a downscaled image by downscaling, based on the first upscaling information, the input image, and obtaining, based on an output resolution, an output image by upscaling the downscaled image.

Also provided herein is a method of controlling an electronic apparatus, the method including: obtaining first upscaling information of an input image by using a first artificial intelligence (AI) model, wherein the first AI model is trained to obtain upscaling information; and performing one of: determining not to downscale the input image, or obtaining a downscaled image by downscaling, based on the first upscaling information, the input image, and obtaining, based on an output resolution, an output image by upscaling the downscaled image.

An electronic apparatus according to an embodiment includes a processor configured to obtain first upscaling information of an input image using a first artificial intelligence (AI) model that is trained to obtain upscaling information of an image, downscale the input image based on the obtained first upscaling information, and obtain an output image by upscaling the downscaled image based on an output resolution.

A method of controlling an electronic apparatus according to an embodiment may include obtaining first upscaling information of an input image using a first artificial intelligence (AI) model that is trained to obtain upscaling information of an image; downscaling the input image based on the obtained first upscaling information; and obtaining an output image by upscaling the downscaled image based on an output resolution.

BRIEF DESCRIPTION OF THE DRAWINGS

The above and/or other aspects, features, and advantages of certain embodiments of the disclosure will be more apparent from the following detailed description, taken in conjunction with the accompanying drawings, in which:

FIG. 7B is a view to describe a method for obtaining a feature value according to an embodiment;

FIG. 7C illustrates an example related to feature information;

DETAILED DESCRIPTION

Figure 1A:
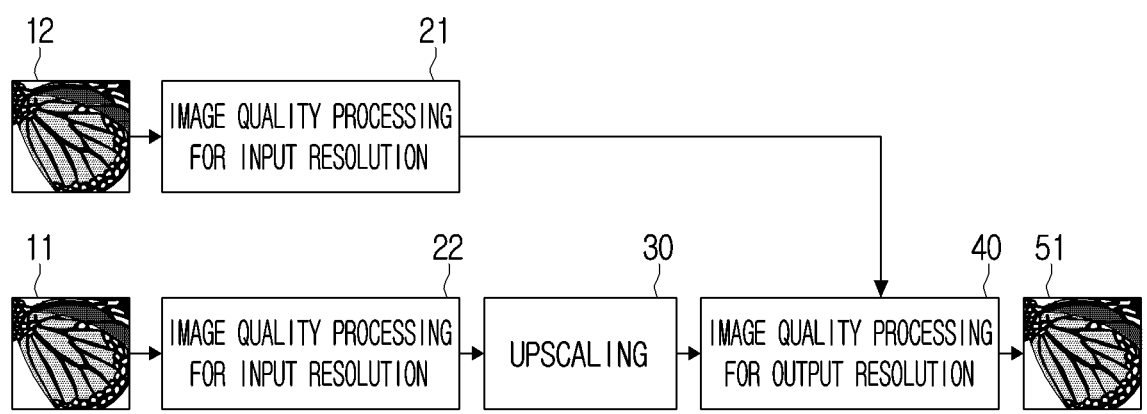
FIG. 1A is a view to describe an image quality processing operation of an electronic apparatus to help understanding of the disclosure.

The disclosure provides an electronic apparatus providing a high-resolution image by estimating an original resolution of an image upscaled from the outside, downscaling the image, and upscaling the downscaled image using a high-performance upscaling technology and a method for controlling thereof.

The disclosure will be further described with reference to the attached drawings.

The terms used in this specification will be briefly described, and the disclosure will be described in greater detail.

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in embodiments of the disclosure should be defined on the basis of the contents throughout the disclosure rather than simple names of the terms.

The terms such as "first," "second," and so on may be used to describe a variety of elements, but the elements should not be limited by these terms. The terms are used only for the purpose of distinguishing one element from another.

A singular expression includes a plural expression, unless otherwise specified. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

It should be understood that at least one of A or B indicates "A", "B" or one of "A and B".

The term such as "module," "unit", "part", and so on is used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor (not shown).

Hereinafter, embodiments will be described in detail with reference to the accompanying drawings so that those skilled in the art may easily carry out the embodiment. However, the disclosure may be embodied in many different forms and is not limited to the embodiments described herein. In order to clearly illustrate the disclosure in the drawings, portions which are not related to the description have been omitted, and like reference numerals have been assigned to similar portions throughout the specification.

FIG. 1A is a view to describe an image quality processing operation of an electronic apparatus to help understanding of the disclosure.

According to the image quality processing operation of the electronic apparatus illustrated in FIG. 1A, different image quality processing paths are applied based on the resolution of an input image. Here, the resolution of the input image may include standard definition (SD) of 720×480, high definition (HD) of 1280×720, full high definition (FHD) of 1920×1080, quad high definition (QHD) of 2560×1440, 4K ultra high definition (UHD) of 3840×2160, 8K ultra high definition (UHD) of 7680×4320, and higher resolutions (e.g., 16K, 32K).

According to an embodiment, if an image 11 below a threshold resolution is input, the electronic apparatus may perform first image quality processing 21 at the input resolution level and then upscale 30 the image processed with first image quality processing to an output resolution, for example, a maximum output resolution, and obtain an output image by performing a second image quality processing 40 for the upscaled image. However, if an image 12 having a resolution greater than or equal to a threshold resolution is input, the electronic apparatus may obtain an output image by performing the first image quality processing 22 for the image, and then processing the second image quality processing 40 for the image processed with the first image quality processing.

Here, the threshold resolution may be determined based on the maximum output resolution of the electronic apparatus. For example, if the electronic apparatus is implemented with a TV in which 4K UHD is the maximum output resolution, the threshold resolution may be determined to be FHD or QHD. For example, as for a TV in which the 4K UHD is the maximum output resolution, when an FHD image is input, the TV may upscale the image to the 4K UHD image, but may not perform a separate upscaling process when the 4K UHD image is input.

That is, according to the embodiment described above, the electronic apparatus may not perform a separate upscaling processing for the image 12 having a resolution greater than or equal to the threshold resolution. For example, if an input image is an image having an output resolution, a separate upscaling process for output is not required, and a high-cost calculator must be used for high-speed operation of hardware (e.g., an application specific integrated circuit (ASIC)) to improve the image quality of a high-resolution image, and an internal buffer having a relatively large capacity may be required. For example, since a line buffer equal to the resolution of the input image must be implemented, for example, in the case of 4K UHD input image, a line buffer of 3840/720=5.33 times longer than the SD input image may be required, and in the case of 8K UHD input image, a line buffer of 7680/720=10.66 times longer than the SD input image may be required. Image quality improvement intellectual property (IP), that is, the function blocks to improve the image quality, is designed to output the optimal image quality when the image of the original resolution is input, and the image quality register values have been set already, the image is already upscaled. In this case, the optimal image quality cannot be guaranteed for the image which has been already upscaled. Accordingly, when a low-quality image of a threshold resolution or greater (e.g., 4K or 8K resolution) generated by a general upscaling technique in a broadcasting station or an external device such as a set-top box is input to the electronic apparatus, functional block for scaling processing 30 needs not be gone through and thus, it is not avoidable to provide a low-quality output image.

In general, then, an upscaling technique applied before item 30 of FIG. 1A is reached, causes a problem if the fact of the upscaling having occurred is ignored.

This disclosure detects whether an upscaling has occurred or not. See below, FIG. 17 item S1710. If an upscaling has occurred, a quantity of the upscaling, similar in some examples to a change in resolution is detected. See below, FIG. 9A and the outputs of the "softmax," also see FIG. 9B and the two kinds of quantities outputs from items 921 and 922. This detection can occur repeatedly as scenes change, see below FIG. 8 "upscale ratio," "probability," and "Final (showing 4K or UP4K)."

It will be described various embodiments wherein an output image with a high resolution is provided using functional blocks for upscaling processing 30 implemented in the electronic apparatus, even when an image having a resolution greater than or equal to a threshold resolution is input to an electronic apparatus.

Figure 1B:
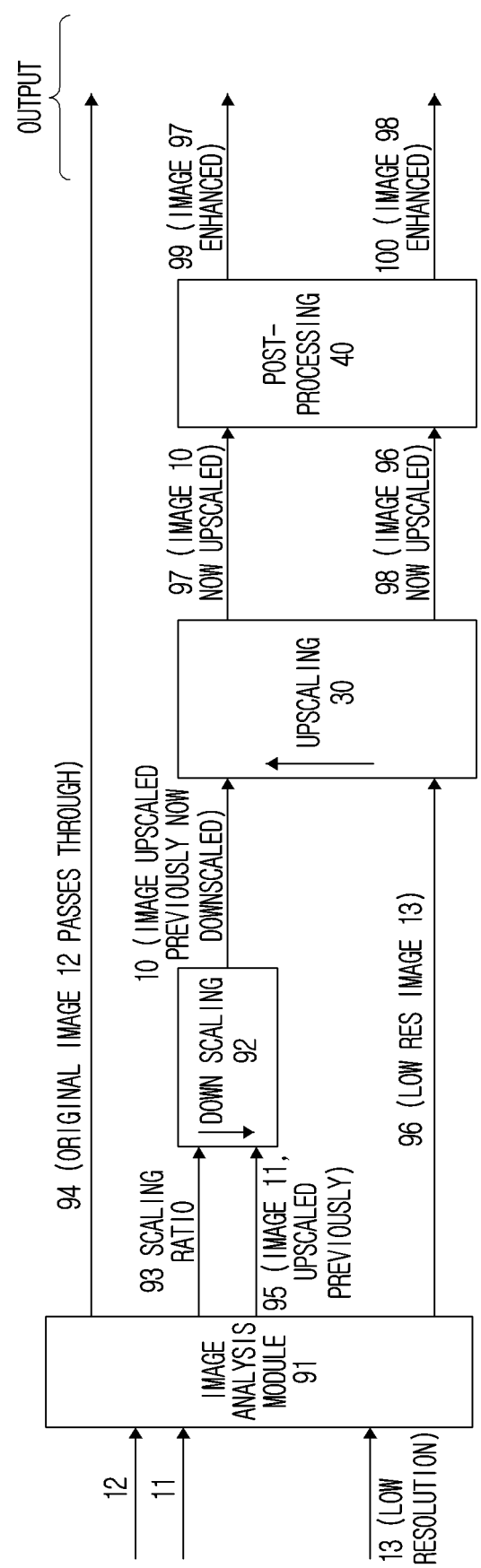
FIG. 1B is a view illustrating example operations according to an embodiment.

FIG. 1B illustrates an example embodiment. In FIG. 1B, one images 11 and 12 of FIG. 1A and an image 13 are presented to an Image Analysis Module 91. Image analysis module 91 only analyzes and routes images, it does not transform or change an input image content or representation.

Image 12 emerges from Image Analysis Module 91 and passes to the output, because it is already high resolution and has not undergone an upscaling previously. In an example shown below in FIG. 12, an example of image 12 is the input signal in the upper left of FIG. 12, labelled HD/FHD/UHD which emerges as UHD(ORIGINAL) in the upper right of FIG. 12 (corresponding to image 94 of FIG. 1B).

Image 13 is low resolution, for example SD, and passes as image 96 to an the upscaling 30. The upscaled version 96 then passes to post-processing 40. An image 100 corresponds to image 98 after post-processing. In the example shown below in FIG. 12, an example of image 13 is the input signal in the lower left of FIG. 12, labelled SD.

Image 11 is a high resolution image which has undergone upscaling previously, for example, by a set top box (STB) or at a broadcaster. Image 11 emerges from Image Analysis Module 91 as image 95 and enters post-processing 40. Image 99, output from the Post-Processing 40, corresponds to image 97, which corresponds to image 10, which corresponds to image 95, which corresponds to image 11. In the example shown below in FIG. 12, an example of image 11 is the input signal in the upper left of FIG. 12, labelled HD/FHD/UHD which emerges as HD/FHD/UHD in the middle of FIG. 12 (corresponding to image 95 of FIG. 1B) along with scaling ratio 93.

By the operations of the modules illustrated in FIG. 1B, image 11 is recognized as being upsampled, but possibly not of good quality, processed, and then output with an improved quality.

Figure 2A:
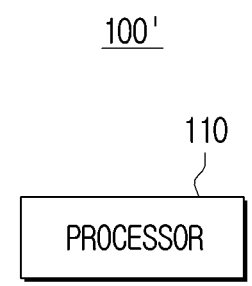
FIGS. 2A and 2B are block diagrams illustrating a configuration of an electronic apparatus according to an embodiment.
Figure 2B:
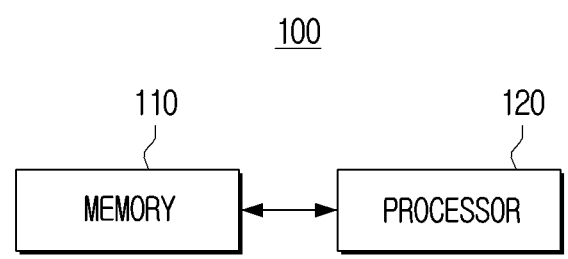

FIGS. 2A and 2B are block diagrams illustrating a configuration of an electronic apparatus according to an embodiment.

Referring to FIG. 2A, an electronic apparatus 100' includes a processor 110, and referring to FIG. 2B, the electronic apparatus 100 includes the processor 110 and a memory 120. The information on the AI model according to an embodiment may be stored in the internal memory of the processor 110, external memory, that is, the memory 120 and thus, FIG. 2A and FIG. 2B have been illustrated separately. Hereinbelow, FIG. 2B will be described.

The electronic apparatus 100 may be implemented as a TV or a set-top box, but is not limited thereto, and may be applicable to any device having image processing and/or display function such as a smart phone, a tablet PC, a notebook PC, a head mounted display (HMD), a near-eye display (NED), a large format display (LFD), a digital signage, a digital information display (DID), a video wall, a projector display, a camera, a camcorder, a printer, a server, or the like. Alternatively, the electronic apparatus 100 may be a system itself in which clouding computing environment is established. The embodiment is not limited thereto, and is applicable to any device for processing data using the AI model.

According to an example, the electronic apparatus 100 may receive an image of various resolutions and various compressed images. For example, the electronic apparatus 100 may receive an image in at least one of a standard definition (SD), a high definition (HD), a full HD (FHD), an ultra HD (UHD), higher than UHD resolutions. The electronic apparatus 100 may receive an image in a compressed form such as a moving picture experts group (MPEG) (for example, MP2, MP4, MP7, etc.), joint photographic coding experts group (JPEG), advanced video coding (AVC), H.264, H.265, a high efficiency video codec (HEVC), VC-1, VP8, VP9, AOMedia Video 1 (AV1) or the like.

The memory 120 may store necessary data for various embodiments of the disclosure. The memory 120 may be implemented as a memory embedded with the electronic apparatus 100, or may be implemented as a detachable memory in the electronic apparatus 100, according to the data usage purpose. For example, data for driving the electronic apparatus 100 may be stored in a memory embedded in the electronic apparatus 100, and data for an expanded function of the electronic apparatus 100 may be stored in the memory detachable to the electronic apparatus 100. A memory embedded in the electronic apparatus 100 may be a volatile memory such as a dynamic random access memory (DRAM), a static random access memory (SRAM), a synchronous dynamic random access memory (SDRAM), or a nonvolatile memory (for example, one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive or a solid state drive (SSD). In the case of a memory detachably mounted to the electronic apparatus 100, the memory may be implemented as a memory card (for example, a compact flash (CF), secure digital (SD), micro secure digital (micro-SD), mini secure digital (mini-SD), extreme digital (xD), multi-media card (MMC), etc.), an external memory (for example, a USB memory) connectable to the USB port, or the like.

According to an example, the memory 120 may store at least one instruction or a computer program including an instruction for controlling the electronic apparatus 100.

According to another example, the memory 120 may store information about an AI model that includes a plurality of layers. Here, storing information about the AI model may mean storing various information related to the operation of the AI model, for example, information about a plurality of layers included in the AI model, information about parameters (e.g., filter coefficients, bias, etc.) used in each of the plurality of layers, and the like. For example, the memory 120 may store information about the first AI model trained to obtain the upscaling information of the input image according to one embodiment. The memory 120 may store information about a second AI model trained to upscale the image according to one embodiment. Here, the upscaling process may include, for example, super resolution processing. However, if the processor 110 is implemented as AI model-only hardware, information about the AI model may be stored in an internal memory of the processor 110.

According to a still another example, the memory 120 may store an image received from an external device (for example, a source device), an external storage medium (for example, universal serial bus (USB)), an external server (for example, web hard), or the like. The image may be a digital moving image but is not limited thereto.

According to still another example, the memory 120 may store various information for image processing, for example, noise reduction, detail enhancement, tone mapping, contrast enhancement, color enhancement, or frame rate conversion, algorithm, image quality parameter, or the like. The memory 120 may store a final output image generated by image processing.

According to an embodiment, the memory 120 may be implemented as a single memory for storing the data generated from various operations of the disclosure. According to another embodiment, the memory 120 may store data of different types, respectively, or may be implemented to include a plurality of memories for storing each of the data in different stages.

In the above embodiment, it has been described that various data is stored in the external memory 120 of the processor 110 but at least a part of the data mentioned above may be stored in the internal memory of the processor 110 according to an embodiment of at least one of the electronic apparatus 100 or the processor 110.

The processor 110 is electrically connected to the memory 120 and controls overall operations of the electronic apparatus 100. The processor 110 may be composed of one or a plurality of processors. The processor 110 may perform an operation of the electronic apparatus 100 according to various embodiments by executing at least one instruction stored in the memory 120.

According to an embodiment, the processor 110 may include a digital signal processor (DSP) for processing a digital image signal, a microprocessor, a graphics processing unit (GPU), an artificial intelligence (AI) processor, a neural processing unit (NPU), a time controller (TCON), or the like, but is not limited thereto. The processor 110 may include, for example, and without limitation, one or more of a central processing unit (CPU), a micro controller unit (MCU), a micro processing unit (MPU), a controller, an application processor (AP), a communication processor (CP), an Advanced Reduced instruction set computing (RISC) Machine (ARM) processor, or the like, or may be defined as a corresponding term. The processor 110 may be implemented in a system on chip (SoC) type or a large scale integration (LSI) type which a processing algorithm is built therein or in an application specific integrated circuit (ASIC), a field programmable gate array (FPGA) type.

The processor 110 for executing the AI model according to one embodiment may be implemented through the combination between a general purpose processor, such as a central processing unit (CPU), an application processor (AP), a digital signal processor (DSP), or the like, a graphics-only processor such as a graphics processing unit (GPU), a vision processing unit (VPU), or an AI-only processor such as a neural processing unit (NPU) with software. The processor 110 may control to process the input data according to a predefined operating rule stored in the memory 120 or AI model. Alternatively, if the processor 110 is a dedicated processor (or an AI-dedicated processor), it may be designed with a hardware structure specialized for the processing of a particular AI model. For example, hardware specific to the processing of a particular AI model may be designed into a hardware chip, such as an application specific integrated circuit (ASIC), field-programmable gate array (FPGA), or the like. When the processor 110 is implemented as a dedicated processor, it may be implemented to include the memory for implementing embodiments of the disclosure, or may be implemented to include a memory processing functionality for using an external memory.

The processor 110 processes the input data to obtain output data. Here, the input data may include at least one of text, images, or user voices. For example, the input data may be input via a communicator communicable with an external device, a user inputter such as a keyboard or a touch pad, a camera, a microphone, or the like. The output data may vary depending on the type of AI model. For example, the output data may be a resolution-enhanced image, object-related information included within the image, a text corresponding to voice, or the like.

According to an example, the processor 110 obtains an output image by performing image processing for the input image. Here, the input image or the output image may include a still image, a plurality of consecutive still images (or frames), or a video. The image processing may be a digital image processing including at least one of image enhancement, image restoration, image transformation, image analysis, image understanding, or image compression. According to an example, if the input image is a compressed image, the processor 110 may decode the compressed image and then perform image processing. According to one embodiment, the processor 110 may perform image processing for the input image using an AI model. For example, the processor 110 may load and use AI model-related information stored in the memory 120, for example, an external memory, such as a dynamic random access memory (DRAM), to use the AI model.

Figure 3:
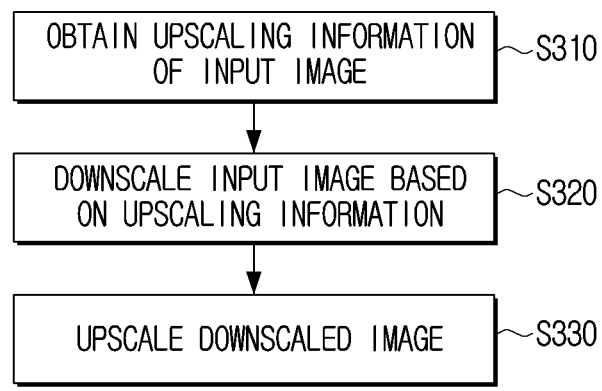
FIG. 3 is a flowchart to describe an operation of an electronic apparatus according to an embodiment.

FIG. 3 is a flowchart to describe an operation of the processor 110 according to an embodiment.

According to an embodiment, the processor 110 may obtain the upscaling information of the input image in operation S310, downscale the input image based on the obtained upscaling information in operation S320, and upscale the downscaled image to obtain an output image in operation S330. The upscaling information of the input image may include at least one of upscaling ratio information of the input image or original resolution information of the input image. The upscaling ratio of an input image may mean, if the input image is obtained by upscaling an original image, the corresponding upscaling ratio. However, since the upscaling ratio can be 1 in the case of non-upscaled image, the upscaling ratio is not a term that is necessarily applied to the image on which the upscaling is performed. According to an embodiment, one processor 110 may perform the operations of steps S310, S320, and S330, but at least some operations of at least some steps may be performed by at least one other processor.

According to an example, the processor 110 may obtain the upscaling information of the input image using a first AI model trained to obtain the upscaling information of the image. However, the embodiment is not limited thereto and it is also possible to obtain the upscaling information of the input image without using the first AI model. For example, the processor 110 may obtain the upscaling information of the input image in a variety of ways based on the pixel information of the input image. For example, the pixel value distribution around the edge region may be confirmed to identify the upscaling ratio or the original resolution information. Herein, according to an embodiment, the first AI model is used to obtain accurate upscaling information.

According to an embodiment, the processor 110 may obtain upscaling information of the input image by inputting the feature information of the input image to the first AI model.

For example, the processor 110 may obtain the probability information for each of the plurality of upscaling ratios by inputting the feature information of the input image into the first AI model, and may identify the upscaling ratio of the input image based on the at least one of the maximum value or a value greater than or equal to a threshold value among obtained probability information. As another example, the processor 110 may obtain the probability information for each of the plurality of original resolution information by inputting the feature information of the input image into the first AI model, and may obtain the original resolution information of the input image based on the at least one of the maximum value or a value greater than or equal to a threshold value among obtained probability information.

In this case, the first AI model may be trained to obtain the upscaling information based on the feature information of the image. Here, the feature information of the image may be information obtained in a specific region of the image. For example, the feature information of the image may be information obtained in the edge region including the edge of the image, and this is because the edge region is a region in which a pixel value change is large by the upscaling of the image. However, the embodiment is not limited thereto, and the feature information may be obtained in at least one of a texture region and a flat region according to cases.

Figure 4A:
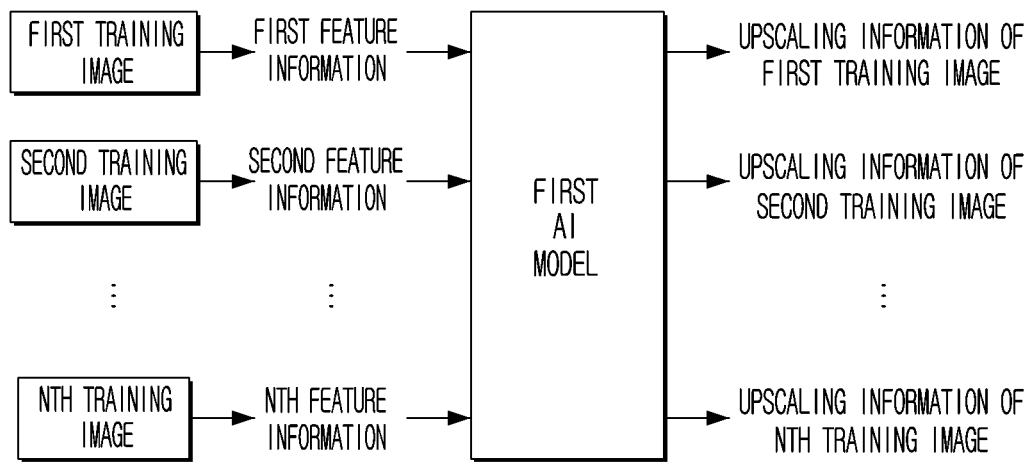
FIG. 4A is a view to describe a training method of a first AI model according to an embodiment.

Here, the first AI model may be trained by using feature information obtained in a plurality of training images and upscaling information (e.g., upscaling ratio or original resolution) of each of the plurality of training images as input/output training data pairs. For example, as shown in FIG. 4A, (first feature information obtained in the first training image, upscaling information of the first training image), (second feature information obtained in the second training image, upscaling information of the second training image), . . . , ($N^{th}$ feature information obtained from the $N^{th}$ training image, the upscaling information of the $N^{th}$ training image) can be used as the input/output training data pair.

According to another embodiment, the processor 110 may obtain the upscaling information of the input image by inputting a whole or a part of the input image into the first AI model. In this example, the first AI model can be a model that is trained to obtain upscaling information based on a whole or a part of an image. Here, a part of the image may include at least a part of an image that includes an interest region, a portion of an image that includes a particular pixel feature (e.g., an edge).

Figure 4B:
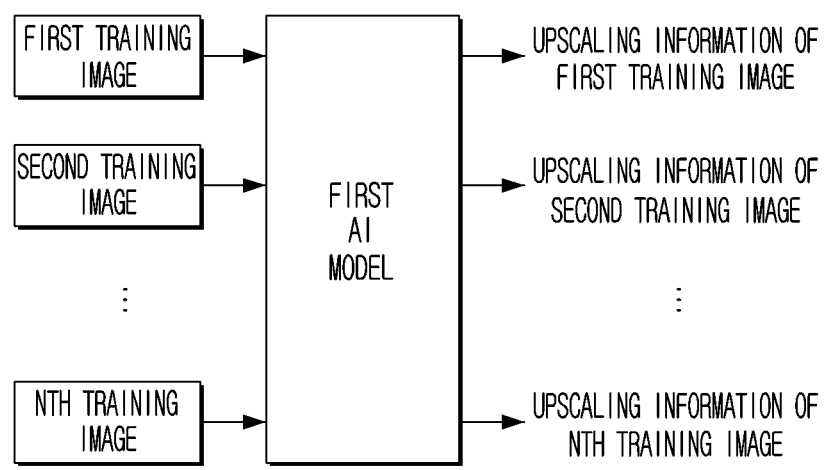
FIG. 4B is a view to describe a training method of a first AI model according to an embodiment.

The first AI model may be trained using the upscaling ration information of the whole image (or a part of the image) and the corresponding image as input/output training data pairs. For example, as illustrated in FIG. 4B, (first training image, upscaling information of the first training image), (second training image, upscaling information of the second training image), . . . ($n^{th}$ training image, upscaling information of the $n^{th}$ training image) as the input/output training data pairs.

The learning of the AI model may mean that a predefined operation rule or an AI model is created so as to perform a desired feature (or purpose) by making a basic AI model (for example, an AI model including arbitrarily random parameters) trained using a lot of training data by a learning algorithm. The training may be performed through a separate server and/or system, but is not limited thereto, and may be performed in an electronic apparatus. An example of learning algorithm includes supervised learning, unsupervised learning, semi-supervised learning, or reinforcement learning, but is not limited thereto.

The first AI model may be implemented as, for example, convolutional neural network (CNN), recurrent neural network (RNN), restricted Boltzmann machine (RBM), deep belief network (DBN), bidirectional recurrent deep neural network (BRDNN), or deep Q-networks, but is not limited thereto.

According to an embodiment, the processor 110 may obtain downscaling ratio of the input image based on the obtained upscaling information.

For example, if the upscaling ratio is obtained, the processor 110 may determine (or identify) inverse of the obtained upscaling ratio as the downscaling ratio. For example, if the upscaling ratio is 2, the processor 110 may determine 1/2, which is the inverse of the upscaling ratio, as the downscaling ratio, and when the obtained upscaling ratio is 2.1, the processor 110 may determine 1/2.1, which is the inverse of the upscaling ratio, as the downscaling ratio. Alternatively, if the original resolution information is obtained, the processor 110 may determine the ratio of the resolution of the input image to the resolution of the input image, that is, the ratio of the "resolution of the original resolution/resolution of the input image" as the downscaling ratio.

Alternatively, after obtaining the upscaling ratio, the processor 110 may adjust the upscaling ratio within the threshold range, and then determine the inverse of the adjusted upscaling ratio as the downscaling ratio. For example, if the obtained upscaling ratio is 2.1, the processor 110 may adjust the upscaling ratio to 2 (e.g., an integer multiple) by applying an approximate scaling of 2/2.1, and then determine 1/2 which is the inverse of the adjusted upscaling ratio, as the downscaling ratio. Similarly, if the original resolution information is obtained, the ratio of the "resolution of the original resolution/resolution of the input image" may be adjusted.

As another example, if the upscaling ratio is obtained, the processor 110 may estimate the resolution of the original image based on the obtained upscaling ratio, and obtain the downscaling ratio of the input image based on the estimated resolution. Specifically, the processor 110 may estimate the resolution of the original image based on the obtained upscaling ratio, when the upscaling ratio is obtained based on the output of the first AI model. For example, the processor 110 may estimate one of the predetermined plurality of resolutions as the resolution of the original image based on the resolution of the original image and the obtained upscaling ratio. For example, the predetermined plurality of resolutions may include a variety of resolutions, for example, 720×480, 1280×720, 1920×1080, 2560×1440, 3840×2160, 7680×4320, or the like.

For example, when the resolution of the input image is 4K UHD of 3840×2160 and the identified upscaling ratio is 2, the processor 110 may estimate that the resolution of the original image is FHD of 1920×1080. As another example, when the resolution of the input image is 4K UHD of 3840×2160 and the identified upscaling ratio is 2.1, the processor 110 may estimate that the resolution of the original image is FHD of 1920×1080.

If the downscaling ratio is determined as described above, the processor 110 may downscale (or down-sample) the input image based on the downscaling ratio, and then scale the downscaled image based on the output resolution. For example, if the resolution of the input image is 4K UHD of 3840×2160 and the output resolution is downscaled according to the 1/2 downscaling ratio, if the output resolution is 8K UHD, the output image may be obtained by upscaling the downscaled image by two times. As for the downscaling method, various related-art methods including a sub-sampling may be used. For example, the downscaling may be performed by converting red-green-blue (RGB) data into YUV data (e.g., Y'UV, YUV, YCbCr, YPbPr), and reducing U, V components (color difference information) contrasted with the Y component (brightness information).

According to an embodiment, the processor 110 may upscale the downscaled image using upscaling functional blocks for high resolution image processing.

In one example, the processor 110 may upscale the downscaled image using a second AI model that is trained to perform super resolution. Specifically, the processor 110 may obtain an upscaled image by inputting the downscaled image into a second AI model. In this case, the second AI model may be trained using a plurality of training images and upscaled images corresponding to each of the training images as input/output training data pairs. Here, the plurality of training images may be images of a variety of resolutions. For the second AI model, for example, a CNN-based very deep super resolution (VDSR) technique (Jiwon Kim, et al., Accurate Image Super-Resolution Using Very Deep Convolutional Networks, CVPR 2016), Enhanced Deep Residual Networks for Single Image Super-Resolution (EDSR), Deeply-Recursive Convolutional Network for Image Super-Resolution (DRCN)." Proceedings of the IEEE Conference on Computer Vision and Pattern Recognition. 2016.), Multi-scale deep super-resolution system (MDSR) may be used, but the embodiment is not limited thereto.

According to one embodiment, the processor 110 may identify a preset region in the input image, obtain the feature information for the pixel included in the identified region, and use it as the input data of the first AI model. Here, the preset region may include at least one of an edge region, a texture region, or a flat region.

According to one example, the processor 110 may identify a region of interest in the input image first, and then identify a predetermined feature region in the region of interest. For example, when there is an image within an image such as a news or a home shopping clip in a real image, or an image that includes a subtitle or a face, there may be a difference in image quality and thus, a region of interest may be identified first and then a predetermined feature area may be identified from the region of interest. Here, the region of interest may be a region including a particular object (e.g., an object centering on a clear edge such as a building, a person, a text, etc.), a region satisfying a specific pixel value distribution (e.g., distribution in which pixel value differences are large among pixel regions), or the like. However, the embodiment is not limited thereto, and a predetermined feature region may be identified without identifying the region of interest in the input image.

In one embodiment, the processor 110 may obtain the feature information for the pixels included in the edge region. Here, the edge is a region where the spatially adjacent pixel values are changing rapidly, and the difference between adjacent pixel values may be greater than or equal to a threshold value. For example, the edge may be a region in which the brightness of an image changes rapidly from a low value to a high value or from a high value to a low value. For example, if a difference between the adjacent pixel values is greater than or equal to a predetermined reference value, the region may be determined as an edge. A boundary or a text of an object may be determined as an edge region. In one embodiment, the edge region may be a region including edge pixels corresponding to edges and a pixel region around the edge pixels.

For example, the processor 110 may obtain the feature information based on pixels outside a margin region with reference to a center pixel included in the identified edge region. As another example, the processor 110 may blur the identified edge region, set (or identify) a margin region with reference to the center pixel included in the blurred edge region, and obtain the feature information based on the pixels other than the set margin region. Hereinbelow, the processor 110 blurs the identified edge region and the obtains the feature information.

Figure 5:
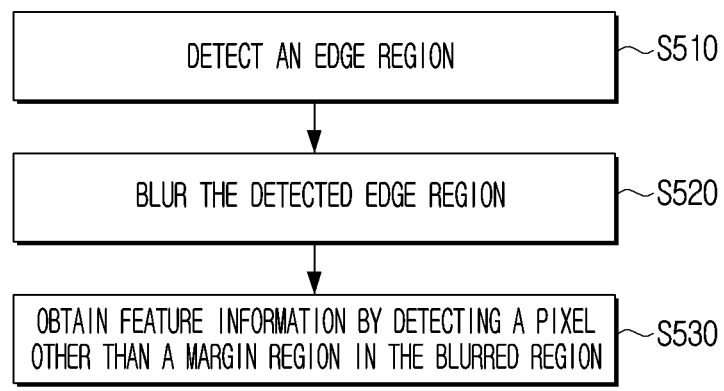
FIG. 5 is a view to describe a method for obtaining feature information input to the first AI model according to an embodiment.

FIG. 5 is a view to describe a method for obtaining feature information input to the first AI model according to an embodiment.

Referring to FIG. 5, the processor 110 detects an edge region in the input image in operation S510. Here, the edge region may be included in a region of interest (interested object or text), but it is not limited thereto.

In one example, the processor 110 may use an edge detection filter to detect edge regions. For example, the processor 110 may apply a primary or a secondary edge detection filter to the input image to obtain a filtered signal that includes edge intensity and edge direction information (direction perpendicular to gradient), and thereby detect edge regions.

Figure 6A:
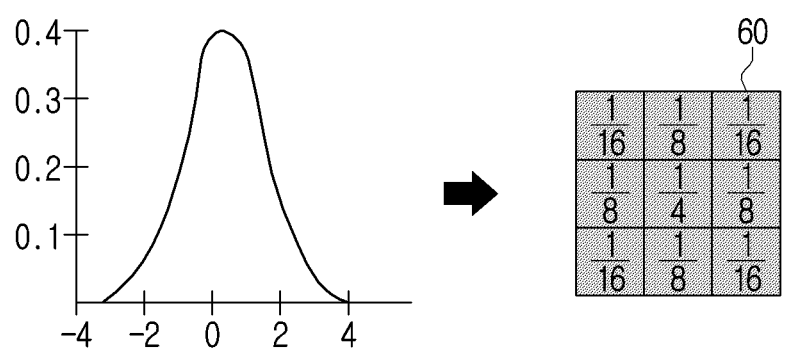
FIG. 6A is a view to describe blurring according to an embodiment.
Figure 6B:
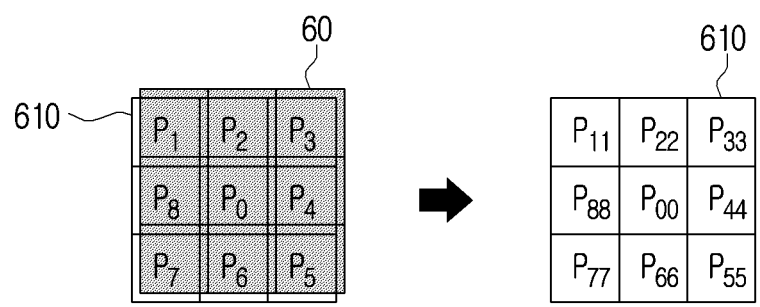
FIG. 6B is a view to describe blurring according to an embodiment.
Figure 7A:
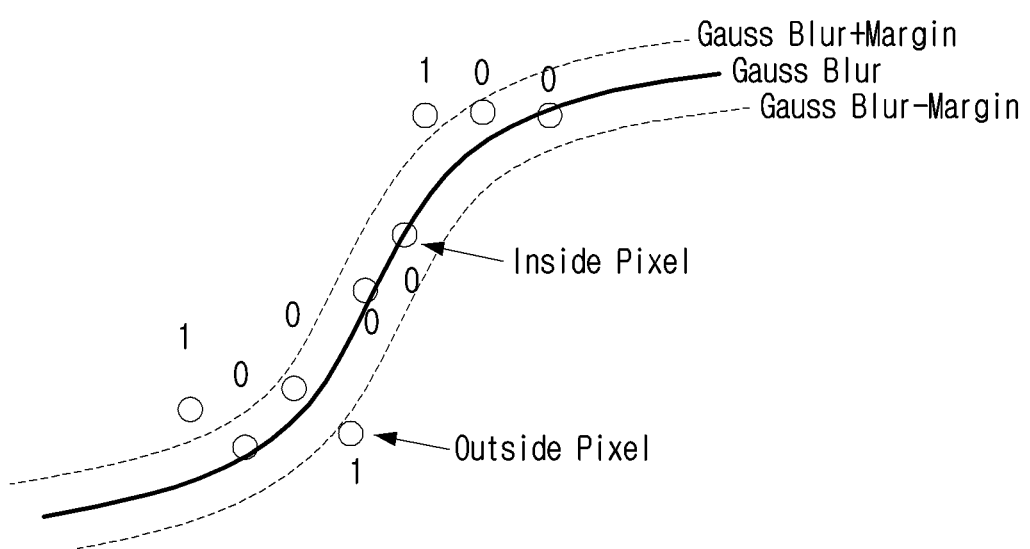
FIG. 7A is a view to describe a method for obtaining a feature value according to an embodiment.

The processor 110 may also expand the edge region detected by blurring (or smoothing) the detected edge region in operation S520. For example, as illustrated in FIG. 6A, the Gaussian distribution may have a form in which zero on the X-axis has a larger weight, and the weight decreases toward the +/− portion. When the Gaussian distribution is applied to the mask 60 in 3*3 format, the center of the mask 60 may have a large weight, and the weight decreases toward the edge of the mask 60. However, the values shown in FIG. 6A are examples, and the filtering values may vary in accordance with a sigma value of the Gaussian function. As illustrated in FIG. 6B, the processor 110 may apply the Gaussian mask 60 to the detected edge region and blur the edge region. Generally, the Gaussian filter is used as a filter to remove the noise generated by the normal distribution through the smoothing and the probability distribution. However, in one embodiment, the Gaussian filter may function to smooth the pixel region identified as an edge in the image and extend a target region to the surrounding pixel region including the edge pixel. For example, as shown in FIG. 7A, the edge region may be extended to a dotted line through smoothing, and thereby, the target region may be extended. Thus, more accurate upscaling ratio may be detected.

In operation S530 of FIG. 5, the processor 110 may set a margin region in the blurred region and obtain the feature information by detecting pixels outside the margin region. Specifically, the processor 110 may obtain information about the pixel that is present in the region outside the margin region (dotted line) that is set with reference to the edge pixel detected as shown in FIG. 7A. Here, the size of the margin region may be determined to a preset size, or may be set based on the size of the filter used for blurring, the coefficient value of the filter, or the like. For example, the predetermined size may be set by considering the upscaling ratios that are most commonly performed in a general image, or may be set by considering the maximum possible upscaling ratio in the present image. The reason is that the pixel value (or similar pixel value) of the edge pixel may be extended to the edge peripheral region according to the upscaling ratio of the image.

According to an example, the processor 110 may map first identification information if the target pixel belongs to the margin region, and may map second identification information if the target pixel does not belong to the margin region and generate the feature information. For example, if binary identification information is used, the first identification information may be 0 and the second identification information may be 1, but is not limited thereto. For convenience of description, the first identification information is set to "0" and the second identification information is set to "1."

According to an embodiment, the processor 110 applies the predetermined size of the pixels to the pixels included in the image, assigns identification information to each pixel by identifying whether the pixels in the window belong to the margin region, and obtains the feature information by arranging the identification information in the predetermined order. Specifically, the processor 110 may identify whether the pixels within the window belong to a margin region by moving the position of the pre-determined size window into at least one pixel interval. For example, the processor 110 may obtain the feature value that corresponds to each position by moving the position of the window in one pixel interval, but the embodiment is not limited thereto, and it is possible to obtain a feature value that corresponds to each position by moving the position in two or more pixel intervals.

According to an example, when a 5-pixel size window is applied to the blurred image as shown in FIG. 7B, 01001 may be obtained by sorting the identification information 1 of the pixel 711 at the right edge relative to the center pixel 710>the identification information 0 of the pixel 712 at the left edge>identification information 0 of the pixel 713 adjacent to the right side>identification information 1 of the pixel 714 adjacent to the left side>identification information 0 of the center pixel 710 in order at the positions of bit0 (20), bit1 (21), bit2 (22), bit3 (23), and bit4 (24). Thereafter, the processor 110 may obtain the feature value "9" by converting the identification information into a decimal number ($2^4*0+2^3*1+2^2*0+2^1*0+2^0*1=9$).

Here, the processor 110 may obtain the histogram information based on the frequency of each of the obtained feature values. For example, each of the feature values represents bin, i.e., a section, and each feature value, i.e., the frequency of each bin, may be calculated. For example, the feature value "9" may be "bin9," and each feature value, that is, frequency of each bin, that is, histogram information, may be obtained as the feature information of the input image.

According to another embodiment, the processor 110 may obtain the feature information by setting the size of window differently and applying different strides for each size of window. Here, the stride means an interval among pixels that generate identification information in the window.

For example, the processor 110 may set the different sizes of window to different types and obtain the feature information as illustrated in FIG. 7C.

As shown in a first line of FIG. 7C, the processor 110 may set the feature value obtained by applying the 5-pixel size window to type 1, and as shown in a second line of FIG. 7C, the processor 110 may set the feature value obtained by applying the 7-pixel size window to type 2, and as shown in a third line of FIG. 7D, set the feature value obtained by applying the 9-pixel size window to type 3, and set the feature value obtained by applying the window having another size to another type (e.g., type 4, type 5).

In order to obtain the feature value of type 1 illustrated in the first line of FIG. 7C, the processor 110 may apply the window in the 5-pixel and stride of 0. A method of obtaining the feature value is the same as shown in FIG. 7B and thus will not be further described.

In order to obtain the feature value of type 2 shown in the second line of FIG. 7C, the processor 110 may apply a 9-pixel window and stride 1. Specifically, the processor 110 may obtain the feature information of the 5-bit size by arranging the identification information of each of the four adjacent pixels as one-pixel interval on both sides of the central pixel basis in a predetermined order. For example, when a 9-pixel size window is applied as shown in the second line of FIG. 7C, 00110 may be obtained by sorting the identification information 0 of the right first pixel 721 with respect to the center pixel 710>the identification information 1 of the left second pixel 722>identification information 1 of the right third pixel 723>identification information 0 of the fourth left pixel 724>identification information 0 of the center pixel 720 at the positions of bit0 ($2^0$), bit1 ($2^1$), bit2 ($2^2$), bit3 ($2^3$), and bit4 ($2^4$). That is, the processor 110 may obtain the feature value of type 2 by sorting identification information of pixels spaced apart at one-pixel interval in a predetermined order within a window of a 9-pixel size. Then, the processor 110 may obtain the feature value "6" by converting to a decimal number ($2^4*0+2^3*0+2^2*1+2^1*1+2^0*1=9$).

By using the same method, the processor 110 may obtain the feature values of different types, for example, type 3 and type 4, by differently setting the window size and the stride size.

Here, the processor 110 may obtain histogram information based on the frequency of each of the obtained type feature values. For example, the processor 110 may obtain feature information for each type, such as type1bin9, type2bin6, type3bin0, and type4bin8.

In the above-described embodiment, it has been described that the feature information is obtained by aligning the identification information in the left-right-left-right order with reference to the center pixel, but this is merely one embodiment. For example, it is possible to obtain the feature information according to various rules by arranging the identification information of the left-most pixel at the positions of bit0($2^0$), bit1($2^1$), bit2($2^2$), bit3($2^3$), bit4($2^4$) in order, or pixel identification information, or arranging the identification information of the left-most pixel in the bit0 ($2^0$), bit1($2^1$), bit2($2^2$), bit3($2^3$), bit4($2^4$) positions in order.

In the embodiment above, although it has been described that the window size and the stride size are adjusted to obtain feature values of the same size (for example, 5-digit binary number) for each type, but the embodiment is not necessarily limited thereto, and it is also possible to vary the size of the feature values by types. For example, it is possible to obtain the feature value of greater size (e.g., 6-digit binary) by maintaining the size of stride even though the size of the window is increased.

In the above-described embodiment, it is assumed that the processor 110 obtains the feature information after blurring the identified edge regions, but it is possible that the process other than the blurring may be applied in the same manner when the feature information is obtained without blurring the identified edge region.

Returning to FIG. 2, according to another embodiment, the processor 110 may perform a first image processing prior to upscaling the downscaled image. In addition, the processor 110 can obtain an output image by performing a second image processing on the upscaled image. For example, the first image processing may include at least one of a noise reduction, a noise reduction simple, detail enhancement or detail enhancement simple, and the second image processing may include at least one of tone mapping, contrast enhancement, color enhancement, or frame rate conversion, but is not limited thereto. For example, the processor 110 may perform pre-filtering on the input image for noise reduction processing. In general, noise is generated in a process of compressing or transmitting an image or the like. The processor 110 may perform noise reduction using non-local filtering and self-similarity, a smoothing filter by low pass filtering, or the like.

When the first image quality processing is performed after downscaling the image, there is an effect of using hardware with low complexity in the first image quality processing and saving hardware implementation costs.

If the input image is an original image rather than an upscaled image and a separate upscaling process is not required, the processor 110 may perform image processing for the input image and then perform a second image quality processing to obtain an output image. Here, the image quality processing performed on the input image may include at least one of a noise reduction simple or detail enhancement simple. That is, the image quality processing performed on the original image may be somewhat different from the first image quality processing method (at least one of noise reduction or detail enhancement) performed on the upscaled image, but the same image quality processing method may be used. However, for the second image quality processing, the same image quality processing method may be used regardless of the resolution of the input image and whether or not the image upscaling is processed.

According to an embodiment, the processor 110 may identify a timing when a scene is changed in the input image and may perform downscaling based on a timing when the scene is changed.

According to one example, when the upscaling information meaningful in a particular scene section of the input image is obtained, the processor 110 may perform downscaling from the next scene based on the corresponding upscaling information. For example, the processor 110 may downscale from a frame included in the second scene section after the first scene section based on the upscaling ratio obtained in the first scene section and upscale the downscaled frame to obtain an output frame. The processor 110 may not perform the downscaling from the next frame when the upscaling information is obtained, but perform downscaling on the basis of the scene change timing, thereby preventing the resolution change due to the frequent change in the upscaling ratio.

According to an example, the processor 110 may identify when the scene changes based on scene change information embedded in the image, for example, a scene change flag. For example, the scene change flag may be included in one region of metadata, and may have a value of "0" if the scene is maintained, but may have a value of "1" when the scene is changed. However, the embodiment is not limited thereto, and various methods can be used to identify the conventional algorithm. The scene can be a scene according to a change in the space on the scenario divided by a content producer. However, in some cases, the scene may mean a section having similar image quality feature, in which case, the scene may be divided into different scenes even in the same space on the scenario divided by the content producer depending on the brightness, the color, and the like, of the image.

The processor 110 may obtain the upscaling information (e.g., the upscaling ratio information, the original resolution information) in units of a predetermined frame interval of the input image, and perform downscaling from the frame where the second scene starts after the scene section of the threshold number when the same upscaling information is maintained in a threshold number of scene sections after the first scene section. This is because of the reason that the scene change information or upscaling information may not be perfectly accurate and thus is to prevent the resolution from being changed for unnecessarily frequently due to frequent upscaling ratio changes. Here, the frame interval may be a time interval including only one frame, and may be a frame unit of one frame. That is, the processor 110 may identify upscaling information on a frame-by-frame basis, and perform downscaling from a frame in which a second scene after a threshold number of scene sections starts when the upscaling information identified for each frame is kept constant in a threshold number of scene sections after the first scene section.

Figure 8:
FIG. 8 is a view to describe a method of scene-based downscaling according to an embodiment.

FIG. 8 is a view to describe a method of scene-based downscaling according to an embodiment.

According to one example, it is assumed that an input image including ten scenes is received by the electronic apparatus 100 as shown in FIG. 8. As shown in the first line of FIG. 8, it is assumed that scene 1 to scene 3 are 4K image, scene 4 to scene 8 are upscaled 4K image (UP4K), scene 9 is 4K image, scene 9 is 4K image, and scene 10 is upscaled 4K image (UP4K).

In this case, the processor 110 can obtain the upscaling information for each frame as shown in the third line of FIG. 8, while detecting scene change flag information in the input image as shown in the second line of FIG. 8. For example, the processor 110 may obtain the upscaling information for each frame based on the output of the first AI model as described above. In a timing when a scene is changed generally, the scene change flag "1" may be detected so that the processor 110 may determine the scene change timing, but in actual, the scene change flag information may be erroneously detected. Thus, in the embodiment, it is assumed that the scene change flag "1" is erroneously detected in an intermediate frame including scene 4, and scene change flag "0", not "1", is detected in timing when the scene is changed to scene 6 and scene 7. Further, it is assumed that the processor 110 may erroneously determine the upscaling information for each frame, and thus it is assumed that the upscaling information for each frame is erroneously detected in some frames.

In this case, when the scene change flag "1" is detected, if the same upscaling information is maintained more than a threshold number (e.g., three frames), the processor 110 may perform the upscaling. For example, in the embodiment shown in FIG. 8, an upscaled 4K image (UP4K) upscaled from scene 4 may be input, but in practice, downscaling may be performed from scene 6 after the same upscaling information is maintained above a threshold number. In addition, the image of scene 9 is a 4K image, but may be ignored, and processing for the upscaled 4K image (UP4K), that is, the downscaling process can be maintained in scene 9.

As described above, when the processor 110 changes the downscaling only at the scene change timing, and if the same upscaling information is continuously detected by more than a threshold number (e.g., three frames), the processor 110 can perform downscaling from the frame at the next scene change timing. This is to apply the embodiment in a conservative manner as much as possible because the frequent resolution change can be excessively recognized by a viewer, and the scene change information or the upscaling information is not perfectly accurate, either. That is, in one scene, every frame-different upscaling ratio and different probability values can be estimated, but these may not be applied as they are. This is because upscaling information can be changed very frequently according to actual news, home shopping, advertisement, or channel change, and if the upscaling information is applied as it is, a side effect may occur due to frequent resolution changes.

Figure 9A:
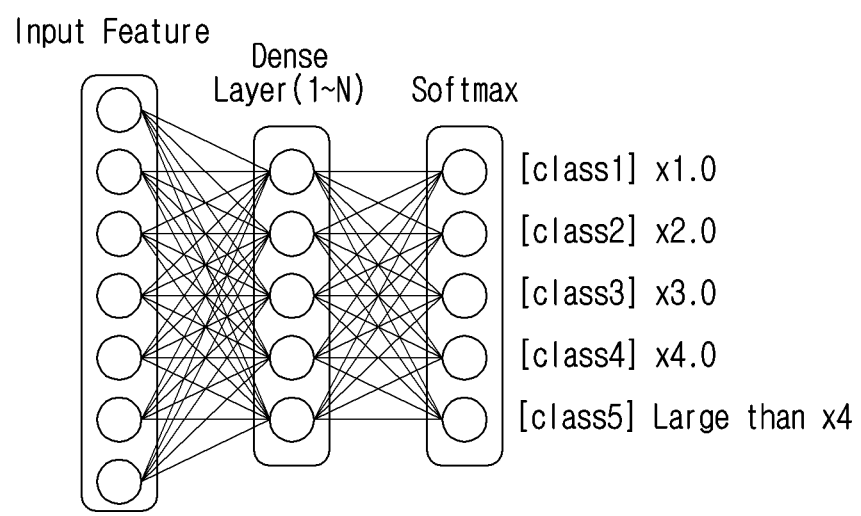
FIG. 9A is a view to describe a structure of the first AI model according to an embodiment.
Figure 9B:
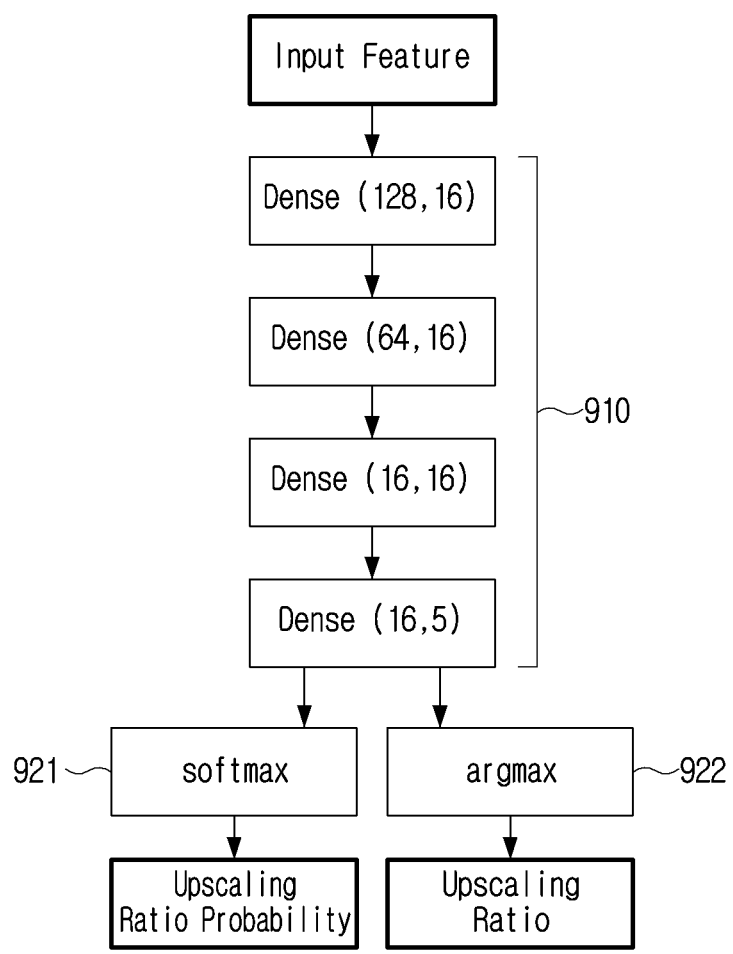
FIG. 9B is a view to describe a structure of the first AI model according to an embodiment.

FIGS. 9A and 9B are views to describe a structure of the first AI model according to an embodiment.

Referring to FIG. 9A, the first AI model may be implemented as a neural network including a plurality of neural network layers. For example, the first AI model may be implemented as a classification network.

According to an example, the input of the neural network may be the feature information of an input image obtained according to the method shown in FIGS. 7A to 7C. According to another example, the input of the neural network may be an input image itself or a portion of an input image. Hereinafter, the case where the input of the neural network is the feature information of the input image according to an example will be described.

According to an example, a plurality of neural network layers, as illustrated in FIG. 9B, for example, four dense layers may be implemented to be sequentially connected. The number of the dense layer is not limited thereto.

Here, as shown in FIG. 9B, the dense layer refers to a layer of a type that is combined with all neurons of a previous layer, and is also referred to as a fully-connected layer. According to one example, the input data may pass through a respective dense layer 910 and for example, the number of output channels decreases as 128 channels→64 channels→16 channels→five channels, and the five channels that are the last output channel number may represent each upscaling ratio.

For example, if the feature information of the input image is obtained as a feature value for each type, as shown in FIG. 7C, the feature value for each type may be the input data of the dense layer. A feature value for each type is input into the first dense layer by 128 channels, and five classes, that is, five upscaling ratio values (e.g., ×1, ×2, ×3, ×4, ×4 or more) and probability values for five classes, that is, probability values corresponding to five upscaling ratio values, can be output in the last dense layer.

According to an example, the feature values for each type may be randomly distributed over 128 channels and input. According to another example, it is possible that the feature values for each type are grouped into different channels based on each type and input. For example, the first type feature value may be input into $1^{st}$ to $25^{th}$ channel, the second type feature value into $26^{th}$ to $50^{th}$ channel, the third type feature value input $51^{st}$ to $75^{th}$ channel, the fourth type feature value input $76^{th}$ to $100^{th}$ channel, and the fifth type feature value into the $100^{th}$ to $128^{th}$ channels. In this case, a parameter corresponding to each channel can be trained to correspond to a corresponding type. For example, the filter coefficients corresponding to the first to $25^{th}$ channels in the first dense layer may be trained to reflect the feature of the first type feature value.

The output portion of the neural network may be implemented to enable an argmax processing 921 and softmax processing 922 as shown in FIG. 9B. Here, softmax is a function that normalizes the input value to the value between 0 and 1 and always makes the sum of the output values to 1, and may have a function to output the probability corresponding to each class, that is, the probability value by upscaling ratios. The argmax functions as a function of selecting the highest probability among a plurality of labels, and in this case, it is possible to select a ratio having the greatest value among the probability values for each upscaling ratio. That is, the original image may finally output the upscaled ratio.

According to one embodiment, the first AI model may be trained based on training data associated with various training images. For example, the first AI model may be trained based on information associated with a plurality of training images of which at least one of a resolution, a compression scheme, a compression rate, a data transfer rate, an upscaling ratio, an enhancement processing, or an order between compression and upscaling is different. For example, training images of various types obtained based on various bit rates such as SD, HD, Full HD, or UHD, various bitrates such as 10 Mbps, 15 Mbps, or 20 Mbps, various bitrate types (e.g., variable bitrate type, constant bitrate type or average bitrate type, etc.), and various compression methods Moving Picture Experts Group (MPEG) (e.g., MP2, MP4, MP7, etc.), Joint Photographic Coding Experts Group (JPEG), Advanced Video Coding (AVC), H.264, H.265, High Efficiency Video Codec (HEVC), VC-1, VP8, VP9, and AOMedia Video 1 (AV1) may be used for learning.

FIGS. 10A to 10F are views to describe a method for obtaining training data for training the first AI model according to an embodiment.

According to one embodiment, the learning database (DB) for training of the first AI model may include training data generated according to various methods. For example, an external server performing the training of the first AI model may generate training data in a variety of ways by considering the real broadcast environment scenario. However, in some cases, the training of the first AI model may be performed by the electronic apparatus 100, and the training data can be generated in the electronic apparatus 100.

For example, learning DB including a plurality of training images of which at least one of a resolution, compression method, compression rate, data transmission rate, upscaling ratio, enhancement processing, compression and upscaling order, or image type is different may be provided.

Figure 10A:
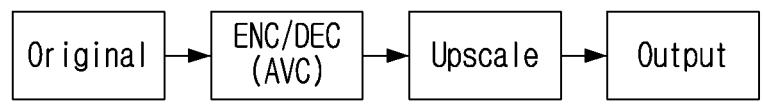
FIG. 10A is a view to describe a method for obtaining training data for training the first AI model according to an embodiment.

For example, the training image may be obtained by compressing the original image in accordance with AVC method as illustrated in FIG. 10A, and then upscaling the compressed image.

Figure 10B:
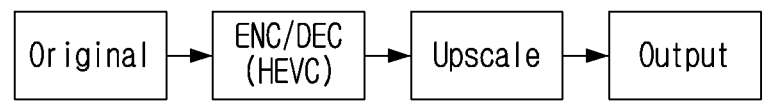
FIG. 10B is a view to describe a method for obtaining training data for training the first AI model according to an embodiment.

As another example, the training image may be obtained by compressing the original image in accordance with the HEVC method and then upscaling the compressed image, as illustrated in FIG. 10B.

Figure 10C:
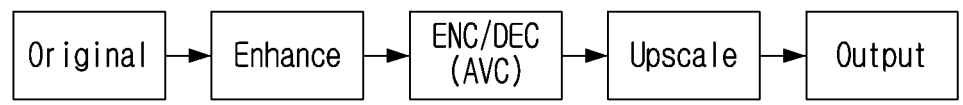
FIG. 10C is a view to describe a method for obtaining training data for training the first AI model according to an embodiment.

As a still another example, the training image may be obtained after processing the original image through the enhance treatment, compressing the enhanced image in accordance with the AVC method, and then upscaling the compressed image, as illustrated in FIG. 10C.

Figure 10D:
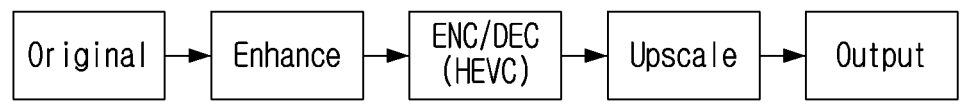
FIG. 10D is a view to describe a method for obtaining training data for training the first AI model according to an embodiment.

As a still another example, the training image may be obtained by processing the original image by the enhancement treatment, compressing the enhanced image in accordance with the HEVC method, and then upscaling the compressed image, as illustrated in FIG. 10D.

Figure 10E:
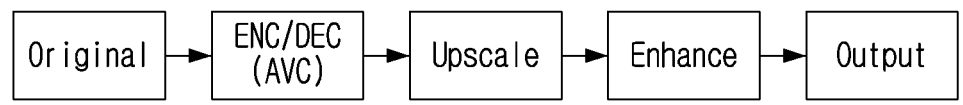
FIG. 10E is a view to describe a method for obtaining training data for training the first AI model according to an embodiment.

As a still another example, the training image may be obtained by compressing the original image in accordance with the AVC method, upscaling the compressed image, and then performing enhancement treatment for the upscaled image as illustrated in FIG. 10E.

Figure 10F:
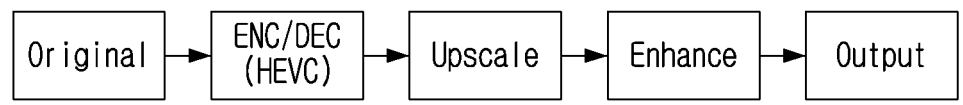
FIG. 10F is a view to describe a method for obtaining training data for training the first AI model according to an embodiment.

As a still another example, the training image may be obtained by compressing the original image in accordance with the HEVC method, upscaling the compressed image, and then performing the enhancement treatment for the upscaled image, as illustrated in FIG. 10F.

The first AI model according to an embodiment may be trained based on training data (for example, feature information and upscaling ratio) obtained from training images in various types as described above.

The embodiments shown in FIGS. 10A-10 F are specific examples to aid in understanding, and various compression schemes may be applied, including at least one of MPEG (e.g., MP2, MP4, MP7, etc.), JPEG, AVC, H.264, H.265, or HEVC. In addition, the enhancement processing may include a noise reduction, a noise reduction simple, a detail enhancement, a detail enhancement simple, a tone mapping, a contrast enhancement, a color enhancement, or a frame rate conversion. In addition, the image type was further derived based on two large-category environmental criteria of broadcast/STB, such as compression method, compression ratio, enhancement, upscaling, and compression order. In addition, the original image may use various resolution images including at least one of SD, HD, Full HD, or Ultra HD. Alternatively, the original image may be a variety of types including at least one of news, drama, or documentary among movies. This is because the image feature may be different depending on the image content types. It is also possible to generate a training image by applying a variety of image processing which may influence the image feature such as image restoration, image transformation, or the like.

As described above, by training the first AI model using various training images that can be used in the real broadcasting environment, an upscaling ratio which is as accurate as possible may be obtained in any input image.

Figure 11A:
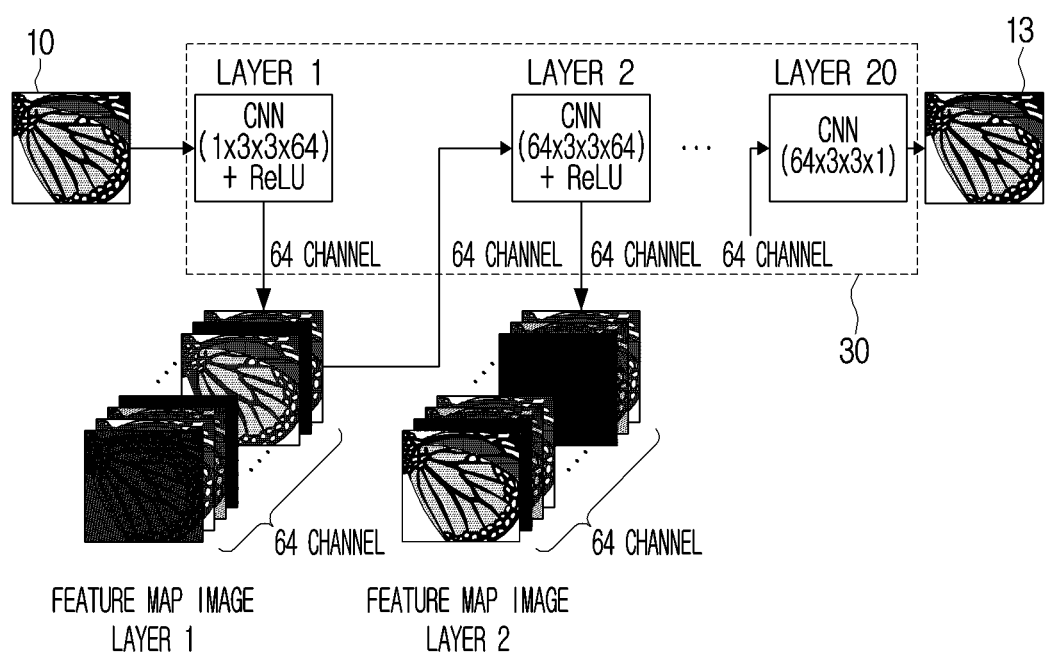
FIG. 11A is a view to describe a method for upscaling processing using the second AI model according to an embodiment.
Figure 11B:
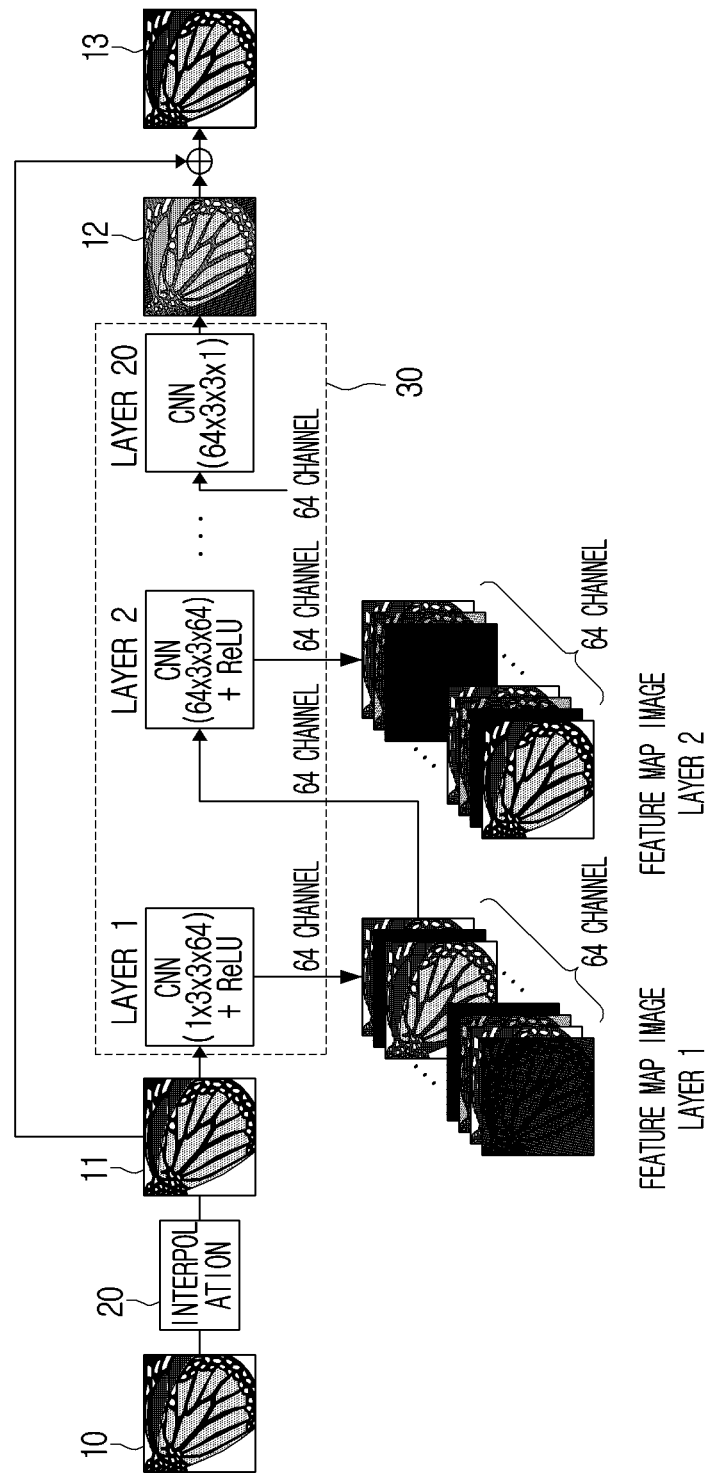
FIG. 11B is a view to describe a method for upscaling processing using the second AI model according to an embodiment.
Figure 11C:
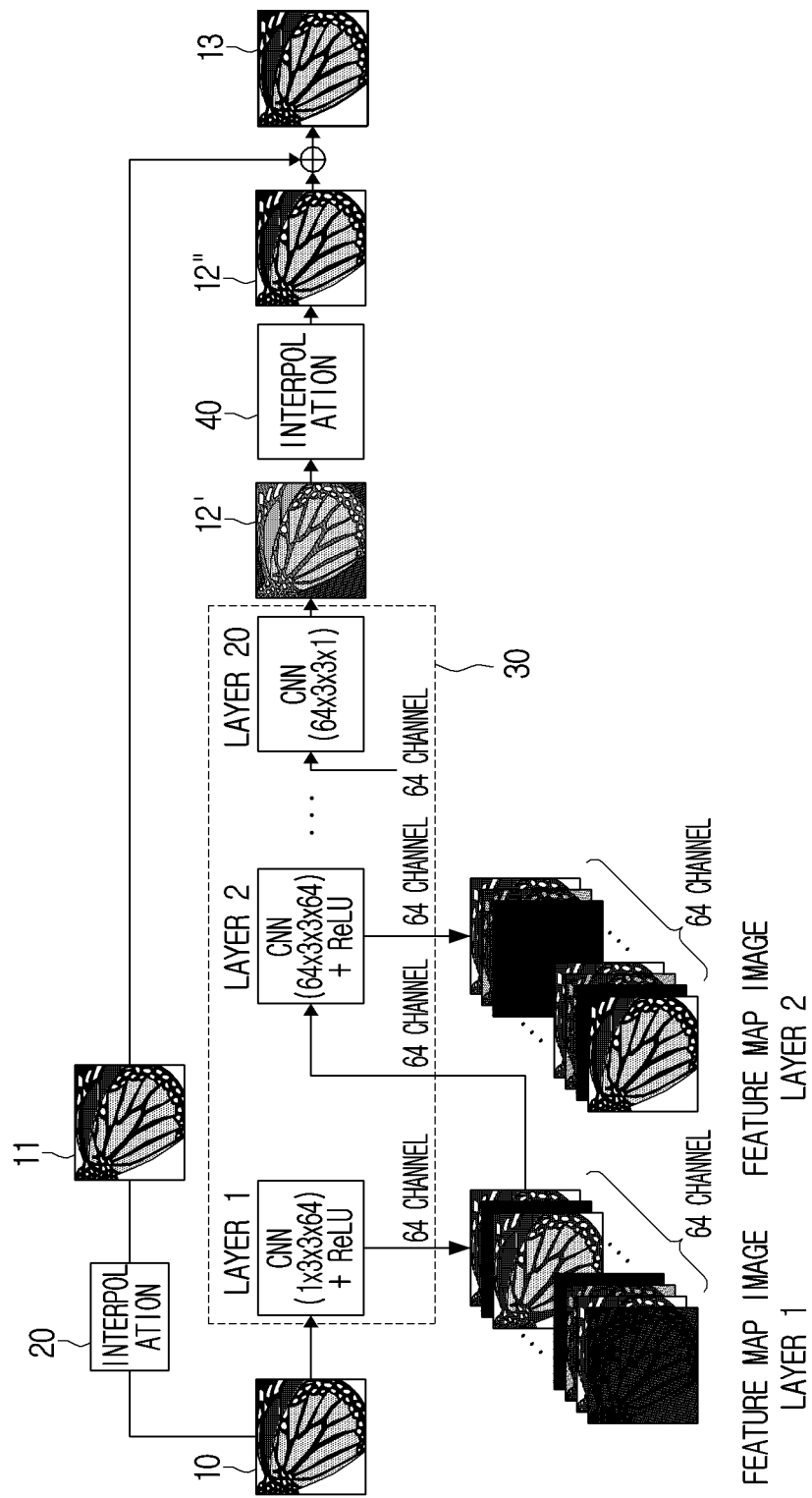
FIG. 11C is a view to describe a method for upscaling processing using the second AI model according to an embodiment.

FIGS. 11A to 11C are views to describe a method for upscaling processing using the second AI model according to an embodiment.

According to an embodiment, the second AI model, that is, an AI model for upscaling of the downscaled image may be implemented as a learning network model for super resolution process. The super resolution indicates a processing of converting a low-resolution image to a high-resolution image through a series of media processing.

According to an embodiment, as shown in FIG. 11A, the processor 110 may upscale the downscaled images using the second AI model 30 formed of a plurality of neural network layers. Each of the plurality of neural networks includes a plurality of parameters (or a plurality of weight values), and may perform a neural network operation by performing an algorithm among a plurality of parameters and a previous calculation result. The parameters included in a plurality of neural network layers may be optimized by the training result of the AI model. For example, parameters may be renewed so that a loss value or a cost value obtained from the AI model during the training process may be minimized. The artificial neural network may include deep neural network (DNN) and may include, for example, convolutional neural network (CNN), recurrent neural network (RNN), generative adversarial networks (GAN), restricted Boltzmann machine (RBM), deep belief network (DBN), bidirectional recurrent deep neural network (BRDNN), or deep Q-networks, but is not limited thereto.

As shown in FIG. 11B, the processor 110 may obtain a residual image 12 by performing the interpolation processing 20 on the downscaled image 10 and inputting the interpolated image 11 to the second AI model 30. That is, the second AI model 30 may be implemented as a residual neural network. Here, each of a plurality of layers forming the residual neural network may generate a residual image for the image interpolated by using a filter including different parameters. Here, the parameter may be the same as the weight (or coefficient) of the filter. In this case, the second AI model 30 may perform algorithm using various activation functions such as Identity Function, Logistic Sigmoid Function, Hyperbolic Tangent(tanh) Function, ReLU Function, Leaky ReLU Function, and the like. However, the second AI model 30 does not necessarily generate the residual image, and may process an image input by various methods according to an embodiment of the second AI model 30, and output the processed image.

In this case, the processor 110 can obtain the output image 13, that is, for example, a high-resolution image, by combining the interpolated image 11 with the residual image 12. Here, the interpolation processing means a process of scaling a low-resolution image to a high-resolution image. At least one interpolation method among, for example, bilinear interpolation, nearest neighbor interpolation, bicubic interpolation, deconvolution interpolation, subpixel convolution interpolation, polyphase interpolation, trilinear interpolation, linear interpolation, and the like, may be used. The residual image can be an image including only residual image information. Here, the residual information may be information in accordance with a difference between an input image and a reference image, and may include, for example, information such as edge direction, edge strength, noise information or texture information, but is not limited thereto. According to another example, the residual information may include at least one of the grayscale information, brightness information, or the gamma information.

According to another example, as shown in FIG. 11C, the processor 110 may obtain a residual image 12' by inputting the downscaled image 10 to the second AI model 30, and interpolated residual image 12" by interpolating 40 the residual image 12'. In addition, the processor 110 may perform the interpolation process 20 for the downscaled image 10 to obtain the interpolated image 11. The processor 110 may obtain the output image 13, for example, a high-resolution image, by combining the interpolated image 11 with the interpolated residual image 12". That is, according to the embodiment shown in FIG. 11C, the residual image 12' may be obtained by inputting the downscaled image 10 to the second AI model 30, unlike the embodiment of FIG. 11B.

According to another embodiment, an AI model other than the second AI model 30, for example, a third AI model, may be further included. In this case, the second AI model and the third AI model may be operated sequentially or in parallel. For example, the processor 110 may input the downscaled image 10 to the second AI model, input the output of the second AI model to the third AI model, and then obtain an output image based on an image output from the third AI model. As another example, the processor 110 may input the downscaled image 10 to each of the second and third AI models and obtain an output image based on a plurality of images output in parallel from the second and third AI models. For example, the second AI model is a model that generates a first residual image, and the third AI model may include a model that generates a second residual image. Alternatively, the second AI model is a model for the upscaling of the resolution, and the third AI model can be a model for one of the above-mentioned diverse image processing (e.g., noise reduction). The second AI model may be a model for the object region processing, and the third AI model may be a model for the background region processing.

Figure 12:
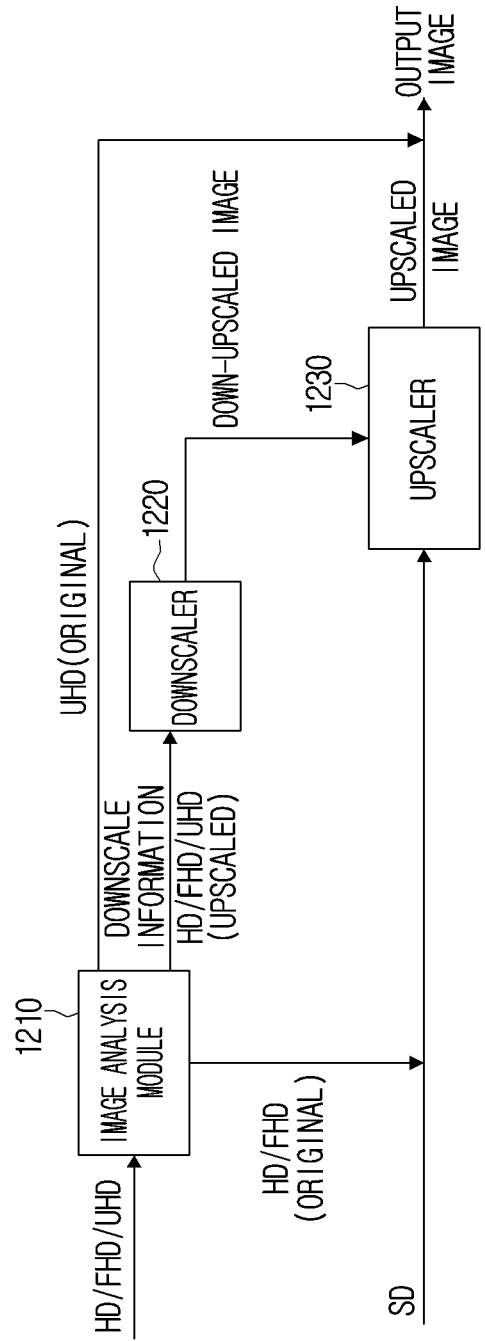
FIG. 12 is a view to describe an operation of an electronic apparatus according to an embodiment.

FIG. 12 is a view to describe an operation of an electronic apparatus according to an embodiment.

FIG. 12 illustrates that the electronic apparatus 100 is implemented as the 4K UHD display device. In FIG. 12, for convenient description, it is illustrated that the processor 110 includes an image analysis module 1210, a downscaler 1220, and an upscaler 1240. The image analysis module 1210, the downscaler 1220, and the upscaler 1240 may be implemented as at least one software, at least one hardware, or combination thereof in the processor 110.

In FIG. 12, for convenient description, it is assumed that resolution of an image input to the electronic apparatus 100 is any one of, for example, SD, HD, FHD, or UHD.

The resolution information may be included in the image input to the electronic apparatus 100, and when the resolution of the input image is SD, the processor 110 determines that upscaling is required, and may provide the received image to the upscaler 1230. However, according to an embodiment, the processor 110 needs to determine whether the input image is an original image or an upscaled image, when the resolution of the input image is one of the HD, FHD, or UHD. In this case, the processor 110 may provide the input image to the image analysis module 1210.

The image analysis module 1210 may analyze the input image to determine whether the input image is the original image or the upscaled image. For example, the first AI model described above can be used to obtain upscaling information of the input image and determine whether the input image is the original image or the upscaled image based on the obtained upscaling information.

The image analysis module 1210 may provide the upscaler 1230 with an input image when the input image is an original image of HD or FHD. This is because the output resolution is UHD and upscaling of the resolution is necessary. The image analysis module 1210 may determine that the input image is not necessary for upscaling if the input image is an original image of UHD, and may not provide the upscaler 1230 with the received image. If the input image is one of the upscaled image of HD, FHD, or UHD, the image analysis module 1210 may determine that it is necessary to perform downscaling and upscaling according to an embodiment, and may provide the downscaler 1220 with the input image along with the corresponding downscaling information (e.g., a downscaling ratio). For example, the image analysis module 1210 may obtain downscaling information based on the obtained upscaling information.

The downscaler 1220 may downscale the input image based on the downscaling information (e.g., the downscaling ratio) provided from the image analysis module 1210. However, it is also possible that the image analysis module 121 provides the upscaling information to the downscaler 1220 and the downscaler 1220 obtains the downscaling information based on the upscaling information.

The downscaler 1220 may perform downscaling for the input image and provide the upscaler 1230 with the downscaled image. For example, the downscaler 1220 may downscale the input image to a resolution of the original image.

The upscaler 1230 may obtain an output image by upscaling the downscaled image received from the downscaler 1220, that is, the downscaled image with the resolution of the original image, based on the output resolution. For example, the upscaler 1230 may obtain a high-resolution output image by upscaling the downscaled image using the upscaling function block to process a high-resolution image. For example, the processor 110 may use a dictionary learning and sparse representation (DLSR) technique to upscale 1340 images for which image quality processing is performed. The DLSR is the technology to enhance the resolution of the input image using the CNN model that is trained based on the training DB including the high-resolution original image and the low-resolution image. According to an embodiment, the DLSR technology may maximize a texture part generation effect in an image through a DLSR processing by including a generative adversarial insurance networks (GAN). In general, the GAN may produce data that is not present in the generator, and the discriminator may operate to produce data that is similar to real data through training to distinguish authentic data and fake data by competitively training two data. By applying the GAN to the image quality enhancement, it is possible to naturally generate textures which are not present in the original image but are similar to the conventional image feature and thus, it is expected to enhance details in the texture region. Accordingly, it is possible to obtain a high-resolution output image. However, DLSR can be designed to be generally upscaled to integer ratios of ×2, ×3, and ×4. As a result, for the resolution of 720×480 to be upscaled to 3840×2160, upscaling of the decimal point is required. For this purpose, various conventional upscaling schemes can be used for upscaling of non-integer ratios.

Figure 13:
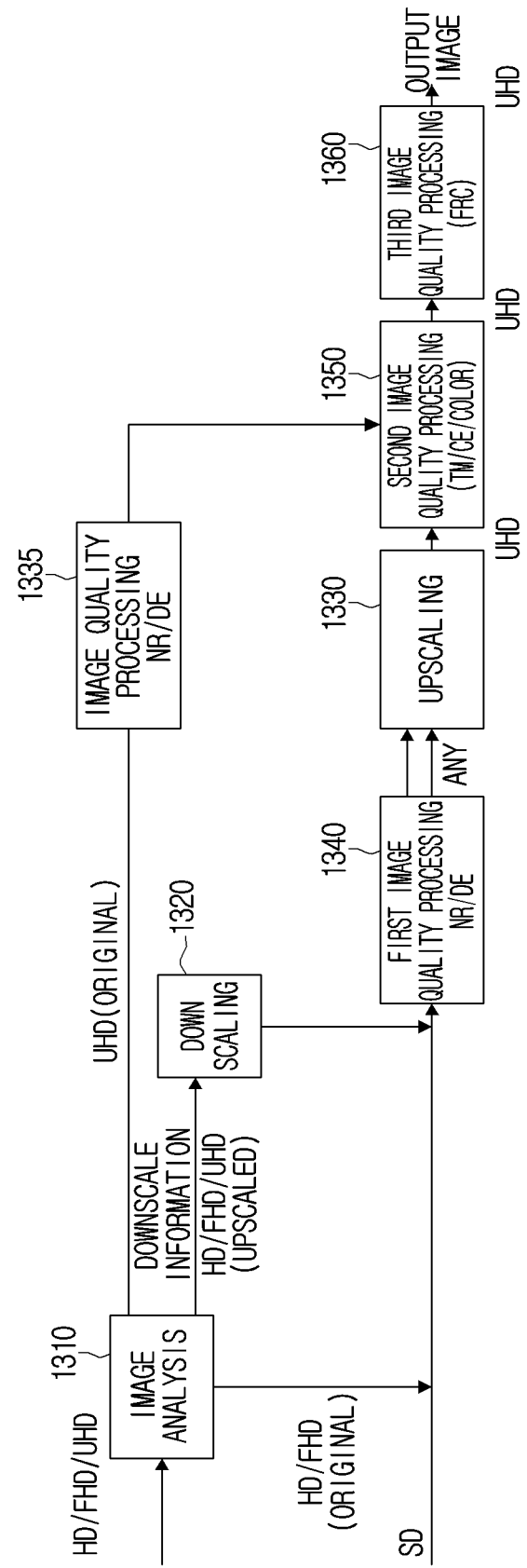
FIG. 13 is a view to describe a modified embodiment of an operation of the electronic apparatus illustrated in FIG. 12.

FIG. 13 is a view to describe a modified embodiment of an operation of the electronic apparatus illustrated in FIG. 12. The configurations of FIG. 13 overlapped with the configurations of FIG. 12 will not be further described.

The processor 110 determines the upscaling ratio of the input image by the image analysis 1310 of the input image. As shown in FIG. 12, the processor 110 performs the image analysis 1310 for an image for which upscaling of HD, FHD, or UHD may be performed, and may not perform a separate image analysis for the SD image, and does not perform a separate image analysis for the SD color image. For example, the processor 110 may identify upscaling status and upscaling information of the input image use the first AI model described above.

If it is determined that the input image is an image obtained by upscaling the original image, the processor 110 can downscale the image based on the downscaling ratio of the input image signal 1320. For example, the processor 110 may downscale the upscaled image to the estimated resolution of the original image. For example, if it is identified that the 4K UHD input image is obtained by upscaling the original image of SD resolution to 4K UHD, the processor 110 can downscale the input image to the SD resolution.

The processor 110 may then perform first image processing 1340 for the image downscaled to the estimated original resolution. The first image quality processing may be an original resolution (e.g., SD resolution) based image quality processing (e.g., noise reduction, detail enhancement). In this case, image quality processing is performed for a downscaled image, for example, a low-resolution image and thus, it is possible to calculate the statistical values of the average/histogram values for image quality processing by hardware and/or software with low complexity.

The processor 110 may perform upscaling 1330 for the image proceed with the first image quality processing to the output resolution (for example, 4K UHD).

The processor 110 may perform second image quality processing 1350 for the image upscaled to the output resolution. The second image quality processing may be image quality processing (for example, tone mapping, contrast enhancement, and color enhancement) based on the output resolution.

The processor 110 may obtain an output image by performing 1360 third image quality processing (for example, frame rate conversion) for the image processed with second quality processing.

As a result of the image analysis 1310, if the input image is 4K UHD original which has not been upscaled, the processor 110 may perform image quality processing 1335 (for example, noise reduction simple, detail enhancement simple) based on the original resolution for the corresponding image and then obtain the output image by performing only the second image quality processing and third image quality processing based on the output resolution. This is because it is not necessary to perform the upscaling process in case of the 4K UHD original image of which resolution is the same as the output resolution. The processor 110 may perform the first image processing 1340, the upscaling 1330, the second image processing 1350, and the third image processing 1360 when the input image is an SD image.

The above image processing based on the input resolution and image processing based on the output resolution is merely an example, and some of the image processing may be omitted, or additional image processing other than the corresponding image processing may be performed.

Figure 14:
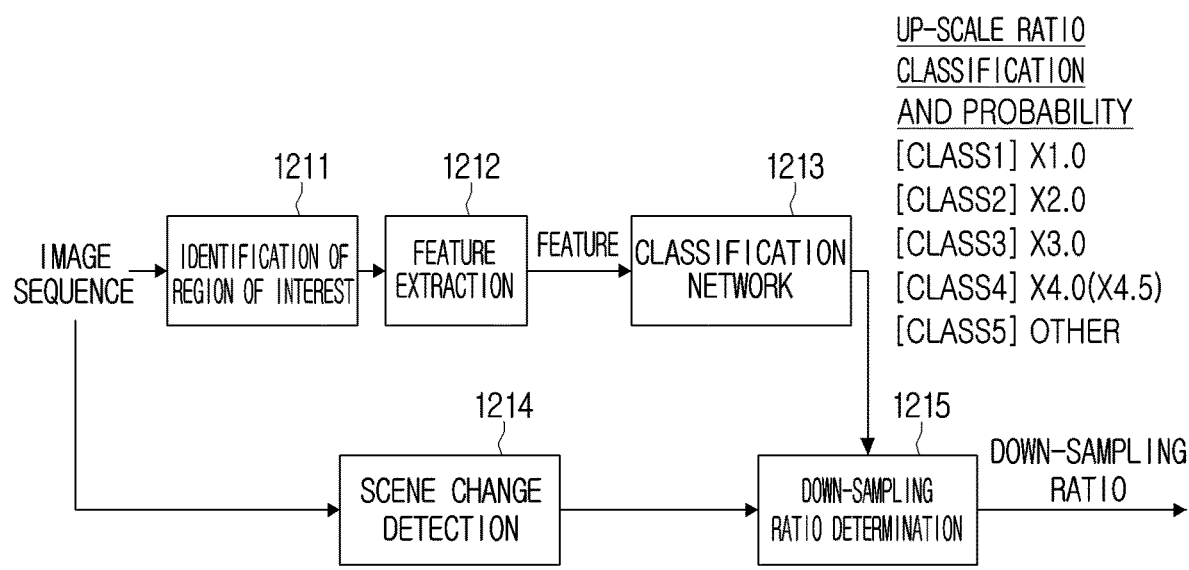
FIG. 14 is a view to describe an image analysis operation illustrated in FIGS. 12 and 13 in a greater detail.

FIG. 14 is a view to describe an image analysis operation illustrated in FIGS. 12 and 13 in a greater detail.

Referring to FIG. 14, the processor 110 may identify 1211 a region of interest in the input image first and then extract 1212 a feature value in the identified region of interest. Identifying the region of interest may be omitted depending on cases.

Subsequently, the processor 110 may input the extracted feature value into a classification network 1213 to obtain upscaling information, for example, an upscaling ratio. Here, the classification network may be implemented with the first AI model described above. For example, the processor 110 may obtain an upscaling rate corresponding to each frame unit.

The processor 110 may detect 1214 the scene change timing in the input image and perform downscaling by determining 1215 the downscaling ratio based on the obtained upscaling ratio and the detected scene change timing. For example, the processor 110 may determine the downscaling ratio for a frame corresponding to the scene change timing, that is, a frame in which a next scene begins and perform downscaling from the corresponding frame. When the same upscaling ratio is detected for more than or equal to a threshold number (for example, three frames) in a consecutive manner, the processor 110 may perform downscaling from the frame at the scene change timing thereafter.

During reproduction of one scene, if upscaling ratio values are different and downscaling is performed whenever the upscaling ratio becomes different for each frame, it is not possible to avoid visibility of a user for image quality change. In order to avoid this problem, a scene detection may be performed and down-sampling may be initiated only at the timing of scene change.

Figure 15:
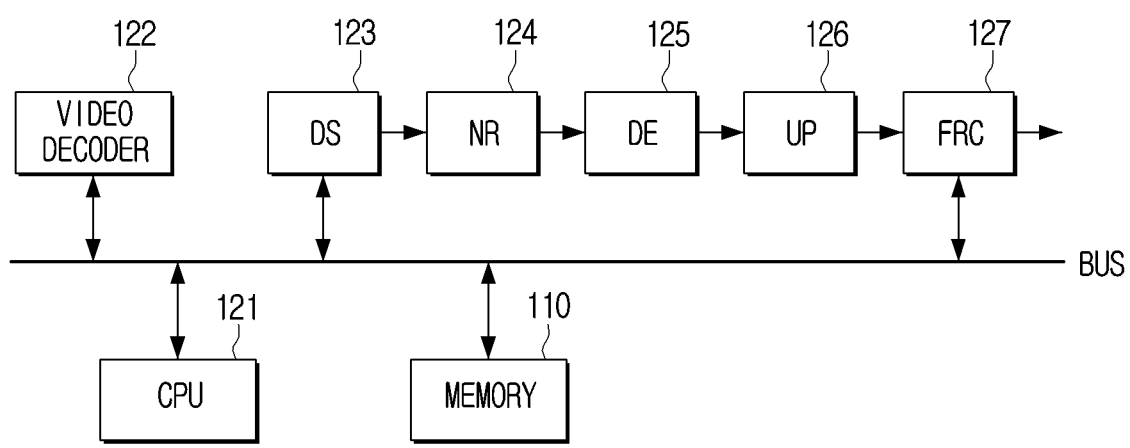
FIG. 15 is a view to describe a hardware structure of an electronic apparatus according to an embodiment.

FIG. 15 is a view to describe a hardware structure of an electronic apparatus according to an embodiment.

FIG. 15 illustrates a chip structure of the processor 110 according to an embodiment, and the processor 110 chip may include solutions for various processing. Here, the solution refers to a reusable functional block and may be a hardware or software functional block. Hereinafter, a case where a solution is implemented as custom hardware will be described for convenient description.

For example, the processor 110 chip for image processing may be implemented so that the custom hardware of the memory 120, CPU 111, a video decoder 112, DS 113, NR 114, DE 115, UP 116, FRC 117 are connected by a bus. In FIG. 15, the configurations corresponding to the second image quality processing part among the configurations of FIG. 13 are omitted for convenience of description.

Here, the video decoder 112 is the custom hardware for the decoding process. According to an embodiment, the input image may be compressed image data, and the video decoder 112 may perform a decoding process for the compressed image. For example, the input image may be image data that has been encoded by a frequency conversion-based image compression method. The video decoder 112 may decode the compressed image data through at least one of a process of generating the quantized residual data through entropy decoding of the compressed image data, inverse-quantizing of the quantized residual data, converting the residual data of the frequency domain component into a spatial domain component, generating the prediction data, or reconstructing the image by using the prediction data and the residual data. The decoding method may be implemented by an image reconstruction method corresponding to one of the image compression method using frequency conversion used in the encoding performed in the image compression, such as the MPEG-2, the H.264, the MPEG-4, the HEVC, the VC-1, the VP8, the VP9, the AV1, or the like.

The DS 113 is the custom hardware for the downscaling processing, the NR 114 is the custom hardware for the noise reduction processing, the DE 115 is the custom hardware for the detail enhancement processing, where the UP 6 is the custom hardware for the upscaling, e.g., super resolution processing, and the FRC 117 can be a custom hardware for frame rate conversion. For example, the CPU 111 may control the operation of the DS 113 based on information about the first AI model stored in the memory 120. Further, the CPU 111 may control the operation of the UP 116 based on information about the second AI model stored in the memory 120. However, the embodiment is not limited thereto, and the operation of the DS 113 and the UP 116 may be controlled by other processors such as NPU.

However, according to another embodiment, the various custom hardware included in the processor 110 chip may be implemented with at least one software or a combination of at least one software and at least one hardware. For example, logic corresponding to some functions of the video decoder 122 may be implemented within the video decoder 112, and logic corresponding to other functions of the video decoder 112 may be implemented as software executable by the CPU.

Figure 16:
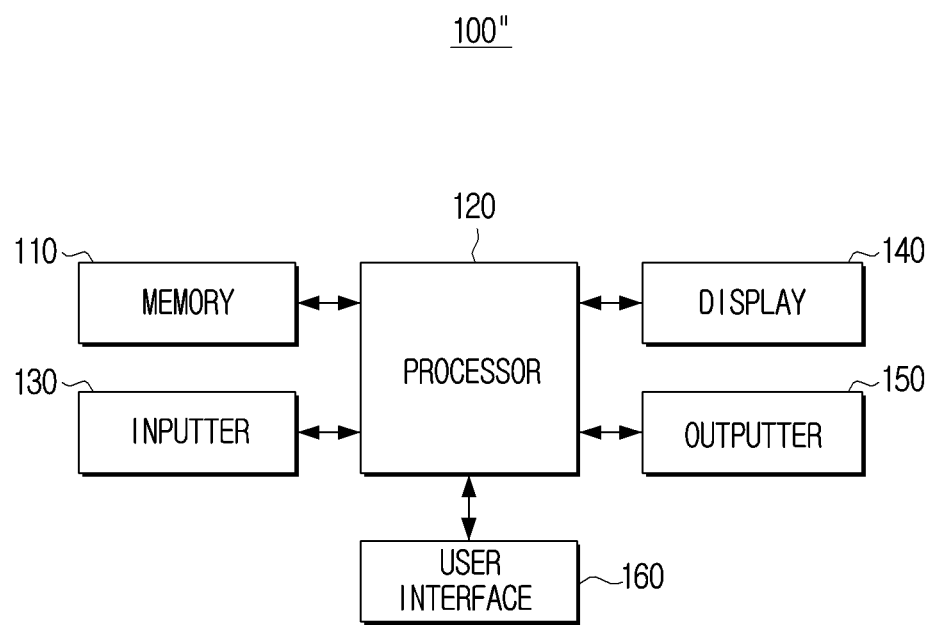
FIG. 16 is a view illustrating an embodiment of an electronic apparatus according to an embodiment.

FIG. 16 is a view illustrating an embodiment of an electronic apparatus according to an embodiment.

Referring to FIG. 16, the electronic apparatus 100" may include the processor 110, a memory 120, an inputter 130, a display 140, an outputter 150, and a user interface 160. The configuration of FIG. 10 which are overlapped with the configurations of FIG. 2 will not be further described.

The inputter 130 may receive various types of content. For example, the inputter 130 may receive an audio signal by streaming or downloading from an external device (for example, a source device), an external storage medium (for example, a universal serial bus (USB) device), an external server (for example, a web server, etc.) through communication methods such as an access point (AP)-based Wi-Fi (wireless LAN network), Bluetooth, Zigbee, wired/wireless local area network (LAN), wide area network (WAN), Ethernet, IEEE 1394, high definition multimedia interface (HDMI), universal serial bus (USB), mobile high-definition link (MHL), advanced encryption standard (AES)/European broadcasting union (EBU), optical, coaxial, or the like. Here, the image signal may be a digital image signal of any one of the SD, HD, full HD, or ultra HD images, but this is not limited thereto.

The display 140 may be implemented as a display including a self-emitting element or a display including a non-self-limiting element and a backlight. For example, the display 140 may be implemented as a display of various types such as a liquid crystal display (LCD), organic light emitting diodes (OLED) display, light emitting diodes (LED), micro LED, mini LED, plasma display panel (PDP), quantum dot (QD) display, quantum dot light-emitting diodes (QLED), or the like. In the display 140, a backlight unit, a driving circuit which may be implemented as an a-si TFT, low temperature poly silicon (LTPS) TFT, organic TFT (OTFT), or the like, may be included as well. In the meantime, the display 140 may be implemented as a touch screen coupled to a touch sensor, a flexible display, a rollable display, a third-dimensional (3D) display, a display in which a plurality of display modules are physically connected, or the like. The processor 110 may control the display 140 to output an output image that is obtained according to various embodiments. The output image may be a high-resolution such as 4K, 8K, or higher.

The outputter 150 outputs a sound signal. For example, the outputter 150 may convert the digital sound signal processed by the processor 110 into an analog sound signal, amplify and output the analog sound signal. For example, the outputter 150 may include at least one speaker unit, a D/A converter, an audio amplifier, or the like, capable of outputting at least one channel. According to an example, the outputter 150 may be implemented to output various multi-channel sound signals. In this case, the processor 110 may control the outputter 150 to process the input sound signal in accordance with the enhanced processing of the input image. For example, the processor 110 may convert an input two-channel sound signal into a virtual multi-channel (for example, 5.1 channel) sound signal, recognize a position where the electronic apparatus 100" is located to process the signal as a cubic sound signal optimized to a space, or provide an optimized sound signal according to the type of input image (for example, a content genre).

The user interface 160 may be implemented as a device such as a button, a touch pad, a mouse, a keyboard, a remote control receiver or transmitter or a touch screen capable of performing the above-described display function and input function. The remote control transceiver may receive a remote control signal from an external remote controller through at least one communication methods such as an infrared rays communication, Bluetooth communication, or Wi-Fi communication, or transmit the remote control signal.

The electronic apparatus 100" may further include a tuner and a demodulator according to an embodiment. A tuner (not shown) may receive a radio frequency (RF) broadcast signal by tuning a channel selected by a user or all pre-stored channels among RF broadcast signals received through an antenna. The demodulator (not shown) may receive and demodulate the digital intermediate frequency (IF) signal and digital IF (DIF) signal converted by the tuner, and perform channel decoding, or the like. The input image received via the tuner according to one embodiment may be processed via the demodulator (not shown) and then provided to the processor 110 for image processing according to one embodiment.

Figure 17:
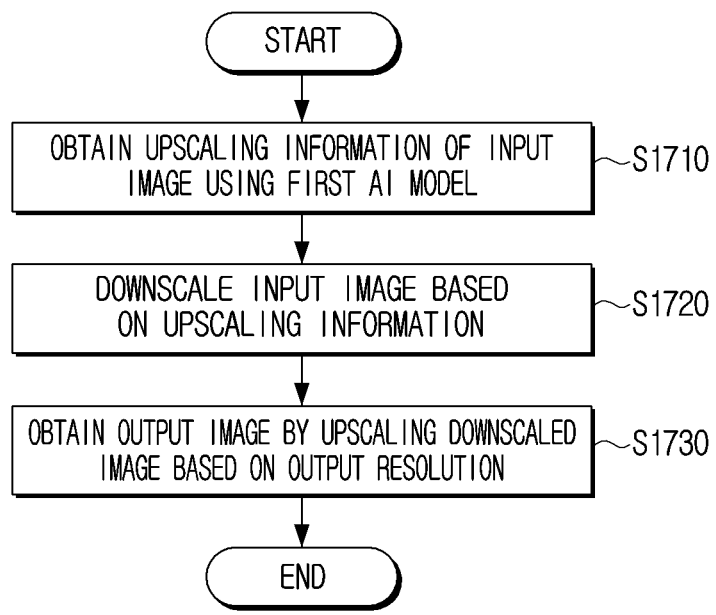
FIG. 17 is a flowchart to describe a method for controlling an electronic apparatus according to an embodiment.

FIG. 17 is a flowchart to describe a method for controlling an electronic apparatus according to an embodiment.

According to a method for controlling the electronic apparatus of FIG. 17, upscaling information of the input image is obtained using the first AI model in operation S1710. The first AI model may be trained to obtain upscaling information of an image. The upscaling information of the input image may include at least one of the upscaling ratio of the input image or original resolution information of the input image.

The input image is downscaled based on the obtained upscaling information in operation S1620.

The output image is obtained by upscaling the downscaled image based on the output resolution in operation S1630.

In operation S1630 of obtaining the output image, first image quality processing for the downscaled image may be performed, the image processed with the first image quality processing may be upscaled, and the output image may be obtained by performing the second image quality processing for the upscaled image.

In operation S1630 of obtaining an output image, a downscaled image may be upscaled using the second AI model. The second AI model may be trained to perform super resolution processing.

According to an embodiment, the first AI model may be trained to obtain the upscaling information of the image based on the feature information of the image. In this case, in operation S1610 of obtaining the upscaling information of the input image, upscaling information of the input image may be obtained by inputting the feature information obtained from the input image into the second AI model.

In operation S1610 of obtaining upscaling information of the input image may include identifying an edge region in the input image and obtaining feature information for a pixel included in the identified edge region.

Also, in operation S1610 of obtaining the upscaling information of the input image, the identified edge region may be blurred, the feature information is obtained for the pixels outside the margin region with respect to the center pixel included in the blurred edge region, and the upscaling information of the input image may be obtained by inputting the obtained feature information into the first AI model.

In operation S1610 of obtaining the upscaling information of the input image may include identifying a region of interest in the input image and identifying an edge region included in the identified region of interest.

According to another embodiment, the first AI model can be a model trained to obtain upscaling information based on the image or edge regions of the image. In this case, in step S1610 of obtaining the upscaling information of the input image, the input image or the image including the edge region of the input image is input to the first AI model to obtain an upscaling ratio of the input image.

In operation S1620 of downscaling the input image may include determining whether to downscale the input image based on a timing when a scene of the input image is changed.

Also, in operation S1620 of downscaling the input image, if the upscaling information is obtained in the first scene section of the input image, downscaling may be performed from the frame included in the second scene section after the first scene section.

In operation S1620 of downscaling the input image, the upscaling information may be obtained in a predetermined frame section of the input image and when the same upscaling information is used in the threshold number of scene sections after the first scene section, downscaling may be performed from the frame in which the second scene section begins after the scene sections in the threshold number.

According to an embodiment, the first AI model may be trained based on information related to a plurality of training images of which at least one of a compression method, a compression rate, an upscaling ratio, enhancement processing status, order between compression and upscaling, or an image type is different.

According to various embodiments described above, after estimating the original resolution of the image upscaled at the outside and then upscaling the image through the high-performance upscaling technology, a high-resolution image may be provided.

By performing image quality processing which is hard to be processed for an upscaled image due to a reason of a hardware fee to a downscaled image, there is an effect of using hardware with low complexity and reducing hardware implementation fee accordingly.

If the embodiment as described above is applied, even if the resolution of the input image is the same as the resolution of the output image, there is a clear distinction in image quality. In this case, it can be determined that the embodiment of the disclosure is applied.

The various embodiments may be applied to not only display apparatuses but also all the electronic apparatuses such as an image receiving device such as a set-top box and an image processing device, and the like. Various embodiments described above may be performed through an embedded server provided in the electronic apparatus, or an external server of the image processing device.

The method according to various embodiments may be implemented as an application or software which may be installed in the conventional electronic apparatus.

In addition, the methods according to various embodiments may be implemented only with software upgrade or hardware upgrade for the conventional electronic apparatus.

While the embodiments described above are capable of being prepared in a program or instruction that may be executed on a computer, the prepared program or instructions may be stored in a medium.

The medium may store computer-executable programs or instructions, store or temporarily store programs or instructions for execution or download. In addition, the medium may be any of a variety of recording means or storage means in which a single or several hardware is coupled, and may be distributed over a network, without being limited to any medium that is directly connected to any computer system. Examples of the medium may include a magnetic medium such as a hard disk, a floppy disk, and a magnetic tape; an optical medium such as a compact disk read only memory (CD-ROM) or a digital versatile disk (DVD); a magneto-optical medium such as a floptical disk; and a hardware device specially configured to store and execute program commands, such as a read-only memory (ROM), a random access memory (RAM), a flash memory, or the like, so that a program instruction may be stored therein. As an example of another medium, there may be an application store for distributing an application, a site for supplying or distributing other various software, a recordable medium or a storage medium managed in a server, or the like.

According to one embodiment, a method may be provided as being included in a computer program product. A computer program product may be exchanged between a seller and a purchaser as a commodity. A computer program product may be distributed in the form of a machine-readable storage medium (e.g., compact disc read only memory (CD-ROM)) or distributed online through an application store (e.g. PlayStore™). In the case of on-line distribution, at least a portion of the computer program product may be stored temporarily or at least temporarily in a storage medium such as a manufacturer's server, a server of an application store, or a memory of a relay server.

The AI model described above can be implemented in a software module. When implemented in a software module (e.g., a program module including instructions), the AI model may be stored on a computer readable recording medium.

The AI model may also be provided in the form of downloadable software. The computer program product may include a product (e.g., a downloadable application) in the form of a software program that is electronically distributed via a manufacturer or an electronic market. For electronic distribution, at least a portion of the software program may be stored on a storage medium or may be temporarily generated. In this case, the storage medium may be a server of a manufacturer or an electronic market, or a storage medium of a relay server.

Each of the elements (for example, a module or a program) according to one or more embodiments may be comprised of a single entity or a plurality of entities, and some sub-elements of the abovementioned sub-elements may be omitted, the elements may be further included in various embodiments. Alternatively or additionally, some elements (e.g., modules or programs) may be integrated into one entity to perform the same or similar functions performed by each respective element prior to integration. Operations performed by a module, program, or other element, in accordance with various embodiments, may be performed sequentially, in a parallel, repetitive, or heuristically manner, or at least some operations may be performed in a different order.

While various embodiments have been illustrated and described with reference to certain drawings, the disclosure is not limited to specific embodiments or the drawings, and it will be understood by those of ordinary skill in the art that various changes in form and details may be made therein without departing from the spirit and scope as defined, for example, by the following claims and their equivalents.

What is claimed is:
1. An electronic apparatus comprising:
a processor configured to perform operations comprising:
obtaining first upscaling information of an input image by using a first artificial intelligence (AI) model, wherein the first AI model is trained to obtain upscaling information based on feature information of the input image, wherein the obtaining comprises:
blurring an edge region included in the input image;
obtaining feature information for a pixel which is not in a margin region, wherein the margin region is identified by a predetermined size with respect to a pixel included in the blurred edge region;
obtaining the first upscaling information by inputting the feature information to the first AI model;
obtaining a downscaled image by downscaling, based on the first upscaling information, the input image; and
obtaining, based on an output resolution, an output image by upscaling the downscaled image to have the output resolution.

2. The electronic apparatus of claim 1, wherein the first upscaling information comprises at least one of upscaling ratio information of the input image or original resolution information of the input image.

3. The electronic apparatus of claim 1, wherein the processor is further configured to perform obtaining the output image by:
performing first image quality processing of the downscaled image to obtain a second image,
obtaining an upscaled second image by upscaling the second image, and
performing second image quality processing of the upscaled second image.

4. The electronic apparatus of claim 1, wherein the processor is further configured to perform upscaling the downscaled image by using a second AI model, wherein the second AI model has been trained to perform super resolution processing.

5. The electronic apparatus of claim 4, wherein the first AI model is configured to obtain the first upscaling information based on second feature information of the input image, and
the processor is further configured to perform obtaining the first upscaling information by inputting the second feature information to the second AI model.

6. The electronic apparatus of claim 1, wherein the processor is configured to perform:
identifying a region of interest in the input image, and
identifying, within the region of interest, the edge region.

7. The electronic apparatus of claim 1, wherein the processor is further configured to perform obtaining the first upscaling information by inputting, to the first AI model, a second image including the edge region of the input image.

8. The electronic apparatus of claim 1, wherein the processor is further configured to perform determining whether to downscale the input image based on a timing when a scene of the input image is changed.

9. The electronic apparatus of claim 1, wherein the first upscaling information is associated with a first scene section of the input image, and the processor is further configured to perform the downscaling, based on the first upscaling information starting with a frame included in a second scene section, wherein the second scene section is after the first scene section.

10. The electronic apparatus of claim 9, wherein the processor is further configured to perform:
obtaining the first upscaling information in a predetermined frame interval unit of the input image, and
based on second upscaling information being unchanged from the first upscaling information in a scene section of a threshold number of scenes after the first scene section, downscaling the input image starting from the second scene section, wherein the second scene section occurs after the threshold number of scenes.

11. The electronic apparatus of claim 1, wherein the first AI model is trained based on first information related to a plurality of training images, wherein the first information includes at least one of a resolution, a compression method, a compression rate, a data transmission speed, an upscaling ratio, enhancement processing, or compression and scaling order is different than that of the input image.

12. A method of controlling an electronic apparatus, the method comprising:
obtaining first upscaling information of an input image by using a first artificial intelligence (AI) model, wherein the first AI model is trained to obtain upscaling information based on feature information of the input image, wherein the obtaining comprises, wherein the obtaining comprises:
blurring an edge region included in the input image;
obtaining feature information for a pixel which is not in a margin region, wherein the margin region is identified by a predetermined size with respect to a pixel included in the blurred edge region;
obtaining the first upscaling information by inputting the feature information to the first AI model;
obtaining a downscaled image by downscaling, based on the first upscaling information, the input image; and
obtaining, based on an output resolution, an output image by upscaling the downscaled image to have the output resolution.

13. The method of claim 12, wherein the first upscaling information comprises at least one of upscaling ratio information of the input image or original resolution information of the input image.

14. The method of claim 12, wherein the method further comprises:
performing first image quality processing of the downscaled image to obtain a second image;
upscaling the second image; and
obtaining the output image by performing second image quality processing of the upscaled second image.

15. The method of claim 12, wherein the method further comprises upscaling the downscaled image by using a second AI model, wherein the second AI model has been trained to perform super resolution processing.

16. The method of claim 15, wherein the first AI model is configured to obtain the upscaling information based on second feature information of the input image, and the obtaining the upscaling information further comprises obtaining the first upscaling information by inputting the second feature information to the second AI model.

17. The method of claim 12, wherein the downscaling the input image further comprises determining whether to downscale the input image based on a timing when a scene of the input image is changed.

18. The method of claim 12, wherein the first AI model is trained based on first information related to a plurality of training images, wherein the first information includes at least one of a resolution, a compression method, a compression rate, a data transmission speed, an upscaling ratio, enhancement processing, or compression and scaling order is different than that of the input image.

* * * * *